US007624089B2

(12) United States Patent
Diener

(10) Patent No.: US 7,624,089 B2
(45) Date of Patent: Nov. 24, 2009

(54) COMMUNICATIONS SERVICES PROVISIONING METHOD AND APPARATUS AND OBJECT PROGRAMMING LANGUAGE FOR DEVELOPING PROVISIONING MODELS

(75) Inventor: Glendon R Diener, Boulder, CO (US)

(73) Assignee: Emperative, Inc., Waltham, MA (US)

( * ) Notice: Subject to any disclaimer, the term of this patent is extended or adjusted under 35 U.S.C. 154(b) by 1344 days.

(21) Appl. No.: 09/809,084

(22) Filed: Mar. 16, 2001

(65) Prior Publication Data

US 2002/0013777 A1    Jan. 31, 2002

Related U.S. Application Data

(60) Provisional application No. 60/189,988, filed on Mar. 17, 2000.

(51) Int. Cl.
G06F 17/30  (2006.01)
(52) U.S. Cl. ......................................................... 707/1
(58) Field of Classification Search .................. 703/21, 703/13; 700/87, 100; 725/114; 709/223, 709/203, 224; 707/3, 102, 100, 104.1, 1; 370/401; 706/46
See application file for complete search history.

(56) References Cited

U.S. PATENT DOCUMENTS

| 5,019,961 | A | * | 5/1991 | Addesso et al. ................ 700/87 |
| 5,019,992 | A | * | 5/1991 | Brown et al. ................... 703/13 |
| 5,021,968 | A | | 6/1991 | Ferketic |
| 5,247,347 | A | * | 9/1993 | Litteral et al. ................ 725/114 |
| 5,283,896 | A | | 2/1994 | Temmyo et al. |
| 5,301,303 | A | * | 4/1994 | Abraham et al. ............ 709/223 |
| 5,317,742 | A | * | 5/1994 | Bapat ............................. 707/3 |
| 5,442,690 | A | | 8/1995 | Nazif et al. |
| 5,452,415 | A | | 9/1995 | Hotka |
| 5,471,399 | A | | 11/1995 | Tanaka et al. |
| 5,473,608 | A | * | 12/1995 | Gagne et al. ................. 370/401 |
| 5,490,097 | A | | 2/1996 | Swenson et al. |
| 5,499,343 | A | * | 3/1996 | Pettus ......................... 709/203 |
| 5,561,752 | A | | 10/1996 | Jevans |
| 5,574,779 | A | | 11/1996 | Ely et al. |
| 5,630,025 | A | * | 5/1997 | Dolby et al. ................... 706/46 |
| 5,687,315 | A | | 11/1997 | Tezuka et al. |
| 5,768,284 | A | | 6/1998 | Cox |
| 5,774,689 | A | * | 6/1998 | Curtis et al. .................. 703/21 |
| 5,778,056 | A | | 7/1998 | Ely et al. |
| 5,790,633 | A | | 8/1998 | Kinser, Jr. et al. |
| 5,802,154 | A | | 9/1998 | Dimolitsas |

(Continued)

OTHER PUBLICATIONS

International Search Report for PCT/US01/05815 dated May 16, 2001, 4 pages.

Primary Examiner—Etienne P LeRoux

(57) ABSTRACT

A provisioning engine for provisioning communications services and a pattern language for configuring the provisioning engine. A plurality of objects can be assembled to define provisioning models representing state machines for carrying out common provisioning operations. The state machines include a set of plural current states of the provisioning model, mechanisms for generating signals, tasks, and at least one transition operative to define conditions under which the tasks are executed and states are added to or removed from the set of current states. Signals can be executed instantaneously or scheduled for later execution to permit provisioning operations to be controlled in a temporal manner. The provisioning models can be executed as specific instances and instances can include calls to other models to be executed as subinstances.

29 Claims, 14 Drawing Sheets

U.S. PATENT DOCUMENTS

| | | |
|---|---|---|
| 5,862,372 A | 1/1999 | Morris et al. |
| 5,881,131 A | 3/1999 | Farris et al. |
| 5,905,494 A | 5/1999 | Krosner et al. |
| 5,915,113 A | 6/1999 | McDonald et al. |
| 5,933,637 A | 8/1999 | Hurley et al. |
| 5,937,048 A | 8/1999 | Pelle |
| 5,940,487 A | 8/1999 | Bunch et al. |
| 5,946,485 A | 8/1999 | Weeren et al. |
| 5,953,389 A | 9/1999 | Pruett et al. |
| 5,958,016 A | 9/1999 | Chang et al. |
| RE36,444 E | 12/1999 | Sanchez-Frank et al. |
| 6,005,576 A | 12/1999 | Kojima et al. |
| 6,009,322 A | 12/1999 | Dumont |
| 6,014,138 A | 1/2000 | Cain et al. |
| 6,014,379 A | 1/2000 | White et al. |
| 6,016,334 A | 1/2000 | Kasrai |
| 6,018,570 A | 1/2000 | Matison |
| 6,018,574 A | 1/2000 | Malik |
| 6,018,737 A | 1/2000 | Shah et al. |
| 6,018,769 A | 1/2000 | Tezuka et al. |
| 6,023,464 A | 2/2000 | Woundy |
| 6,038,378 A | 3/2000 | Kita et al. |
| 6,321,133 B1 * | 11/2001 | Smirnov et al. ............. 700/100 |
| 6,349,335 B1 * | 2/2002 | Jenney ....................... 709/224 |
| 6,631,354 B1 * | 10/2003 | Leymann et al. .............. 705/8 |

* cited by examiner

FIG. 9

| Pattern Name | Display Name | Description | Do Task | Pre Task | Post Task |
|---|---|---|---|---|---|
| AndSplitAndJoin | | | N/A | N/A | N/A |
| DoUndo | BillEvent | | com.multiflow.... | N/A | N/A |
| DoUndo | BillEvent | | com.multiflow.... | N/A | N/A |
| DoUndo | DHCP | | branta.SignalS... | N/A | N/A |
| DoUndo | DHCP/DDNS | | branta.SignalS... | N/A | N/A |
| DoUndo | Email | | branta.SignalS... | N/A | N/A |
| DoUndo | Email | | branta.SignalS... | N/A | N/A |
| DoUndo | Web | | branta.SignalS... | N/A | N/A |
| DoUndo | Web | | branta.SignalS... | N/A | N/A |

Pattern
- Pattern Name: DoUndo
- Display Name: Email
- Id: DoUndo_00h
- Description
- Do Task: branta.SignalSlave {slaveId:createEmail url:"local://"}

Apply   Reset 510, 520, 530, 540, 550, 560, 570, 580, 590

COMMUNICATIONS SERVICES PROVISIONING METHOD AND APPARATUS AND OBJECT PROGRAMMING LANGUAGE FOR DEVELOPING PROVISIONING MODELS

RELATED APPLICATION DATA

This application is related to applicant's earlier filed patent application Ser. No. 60/189,988 filed Mar. 17, 2000 the disclosure of which is incorporated herein by reference in its entirety.

BACKGROUND OF THE INVENTION

1. Field of the Invention

The invention relates to provisioning of communication services and more particularly to a method and apparatus for temporal control of the provisioning process and an object programming language for developing provisioning models.

2. Description of the Related Art

The term "provisioning" refers to accomplishing work processes necessary to provide communications service installation, configuration and management for various parties. For example, when new telephone service is ordered by a customer, the phone company may have to make various physical connections to build circuits as well as various data entries into a customer database, a billing system, and the like. The provisioning process becomes even more complicated for Internet service. For example, when provisioning, dial up, cable, or Digital Subscriber Line (DSL) Internet service for a new customer, the Internet Service Provider (ISP) must accomplish a plurality of work processes such as configuring and creating an email account, configuring and creating a hosting account, and establishing DHCP (Dynamic Host Configuration Protocol).

U.S. Pat. Nos. 5,774,689, 5,790,633, 5,881,131, and 5,937,048 are representative of the state of the art in communications provisioning systems. U.S. Pat. No. 5,774,689 discloses a provisioning system in which information relating to infrastructure components are stored in a database as objects. However, these patents fail to disclose flexible provisioning engines or programming methods therefor. Specifically, conventional provisioning methods do not permit flexible temporal control of the various work processes that must be accomplished. For example, it is often necessary to attempt some provisioning work processes plural times before they are successfully accomplished because of errors and delays inherent in complex communication networks. Further, some work processes must be successfully accomplished prior to beginning another work process. For those reasons, provisioning is very complex and conventionally has required intervention of a customer service representative to take services request information from a customer and to ensure that all work processes are accomplished successfully and in the right order.

U.S. Pat. Nos. 5,946,485, 5,019,961, 5,862,372, and 6,014,138 disclose various object oriented programming techniques for facilitating flexible programming. These patents, like other examples of object oriented programming, do not provide for temporal control of work processes and thus are not suitable for the complexities of provisioning processes.

U.S. Pat. No. 5,283,896 discloses a system for controlling mutually exclusive resources, such as computer peripheral devices, using Petri Net techniques. Each task is represented by an underlying state machine having a single token, i.e. state. The tasks are arranged sequentially or in parallel based on the order in which the tasks are to be executed. This reference does not relate to communications provisioning techniques and does not teach or suggest the temporal control of work processes as is desirable in provisioning systems.

The ability of communications service providers to handle the volume of service installations and the management of the service delivery requirements is further limited by the fact that there are a myriad of commercial customer management and network device configuration systems. In order to minimize the possibility of affecting current service due to system incompatibilities, service providers often must use systems from only a single vendor for customer care applications and a single vendor for network solutions. However, this approach locks providers into long-term vendor relationships and can limit the provider's ability to create and deliver new services. A more flexible provisioning engine would alleviate this limitation.

SUMMARY OF THE INVENTION

It is an object of the invention to automate and manage communications services provisioning.

It is another object of the invention to facilitate subscriber self-management of communication services.

It is another object of the invention to execute large numbers of complex provisioning work processes very efficiently and in a temporal manner.

It is another object of the invention to enable automated rescheduling of provisioning work processes that are not completed.

It is another object of the invention to facilitate the provisioning of various communication services by allowing a provisioning model to be easily configured and reconfigured with objects of standard provisioning functions.

It is another object of the invention to accurately track the current status of a plurality of provisioning work processes.

It is another object of the invention to allow provisioning of communicating services involving plural systems from different vendors.

It is another object of the invention to permit provisioning models to be easily configured using predefined objects.

These and other objects are achieved by a first aspect of the invention which is a provisioning engine for provisioning communications services including a provisioning model for carrying out common provisioning work processes. The provisioning model includes a state machine comprising a set of plural current states of the provisioning model, and at least one transition operative to define conditions under which states are added to or removed from the set of current states.

A second aspect of the invention is a pattern language for provisioning communications services by developing a provisioning model for carrying out common provisioning operations. The pattern language includes a plurality of objects each representing a state machine. Each of the objects comprises a set of plural current states and at least one transition operative to define conditions under which states are added to or removed from the set of current states and under which tasks for performing work processes are executed.

BRIEF DESCRIPTION OF THE DRAWING

The invention is described through a preferred embodiment and the attached drawing in which:

FIG. 9 illustrates the model developer property screen of the preferred embodiment;

DETAILED DESCRIPTION OF THE PREFERRED EMBODIMENT

Figure 1:
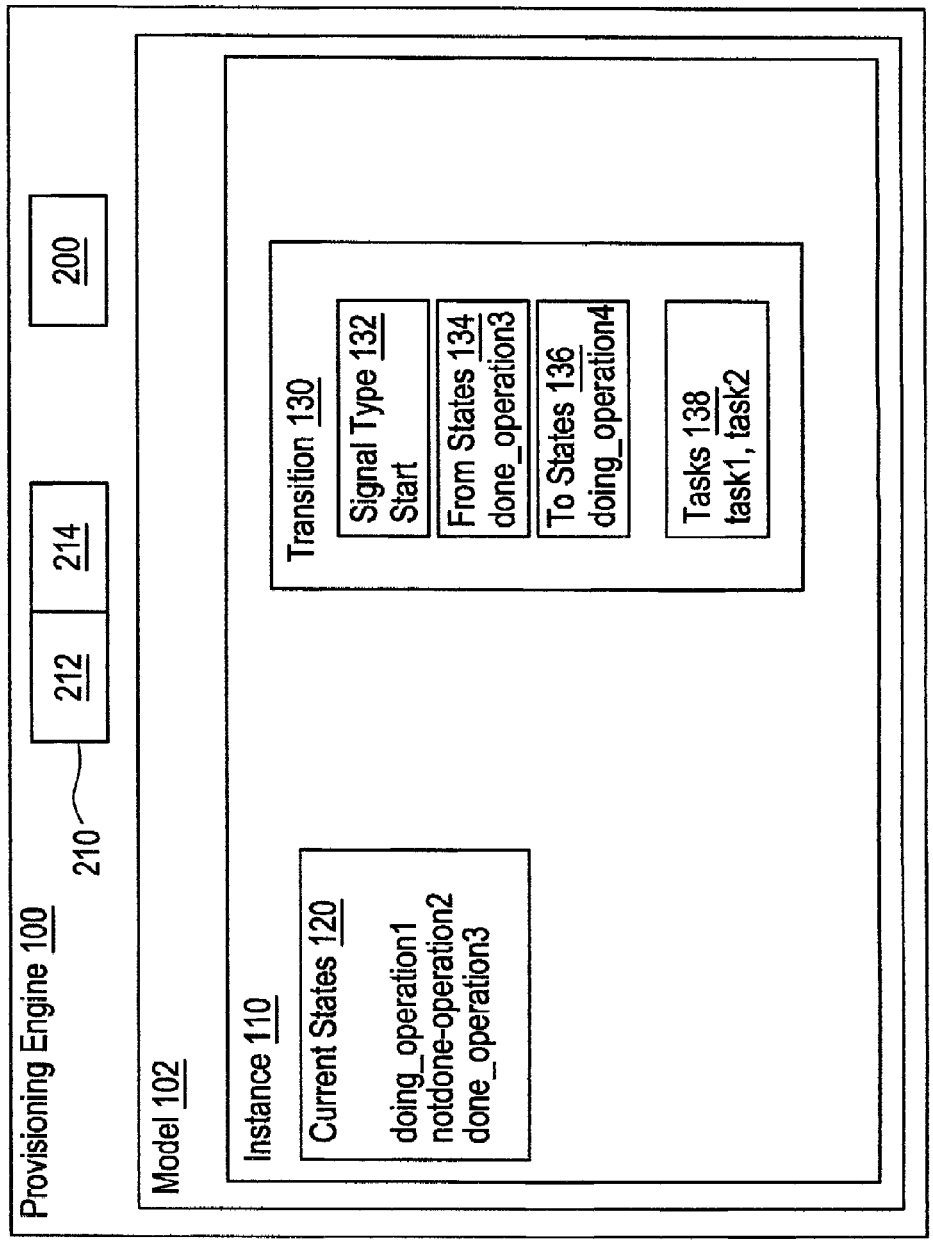
FIG. 1 is a block diagram of a provisioning engine in accordance with the preferred embodiment.

FIG. 1 is a block diagram of a provisioning engine of the preferred embodiment. Provisioning engine 100 includes executing instance 110 of provisioning model 102 designed to carry out a provisioning process. For example, provisioning model 102 can be designed to provision Internet dial up service for a new subscriber. Model 102 can include, for example, the work processes of creating an email account, creating a host account, DHCP configuration, and the like. Provisioning model 102 defines a state machine to manage the complexities of the provisioning process. As will be described below, provisioning model 102 incorporates mechanisms for controlling work process flow in time. Accordingly, provisioning engine 100 can manage the complex temporal problems frequently associated with provisioning.

Engine 100 can be in the form of software code executed on a general purpose computer, such as a server. Engine 100 can be programmed in various known programming languages and compiled to run under various known operating systems, such as Windows™ or Unix. Model 102 carries out provisioning work processes by executing tasks 138. In the preferred embodiment tasks 138 can be external programs, scripts, or other code that are dynamically loaded and unloaded from engine 100 itself to increase overall throughput and flexibility. Tasks 138 can be written in conventional programming languages, such as Java™, or in a proprietary scripting language. Tasks 138 are described in greater detail below.

Engine 100 can be utilized to configure any number of provisioning models 102 which each define a plan, i.e. a set of work processes which must be followed to accomplish a particular provisioning operation, such as set up of a dial-up Internet account. In addition, each provisioning model 102 can be executed as one or more executing instances 110. Instance 110 is responsible for carrying out the work processes of provisioning model 102 for a particular provisioning operation. As noted above, model 102 might define the work processes necessary to activate Internet service for an individual dial-up customer. Instances 110 of model 102 would then be created and run, i.e. executed, every time a new customer requests dial-up Internet service.

Engine 100 of the preferred embodiment utilizes state machines incorporating a modified Petri Net algorithm to allow engine 100 to easily manage tasks 138 which must be controlled in a temporal manner. Each provisioning model 102 defines such a state machine, and each instance 110 represents a specific execution of that state machine. Each model 102, and thus each instance 110, includes set of current states 120 and at least one transition 130. Current states 120 can simply be arbitrary character strings corresponding to the status of real-world provisioning work processes, such as notDone (process not accomplished)", or "doing_dhcp" (currently accomplishing a DHCP process), "undoing_email" (currently undoing an email account setup). Current states 120 will be described in greater detail below.

A conventional state machine has a single current state. Provisioning engine 100 of the preferred embodiment utilizes instances 110 as state machines having a set of plural current states 120. For example, in instance 110 of the preferred embodiment current states 120 include "doing_operation1", "notdone_operation2", and "done_operation3." As is described below, the use of a set of plural current states 120 rather than a single current state provides distinct advantages when controlling work processes, particularly work processes in a temporal manner and which may or may not execute successfully the first time. Of course, each instance 110 maintains its own set of current states 120 independently.

Figure 2:
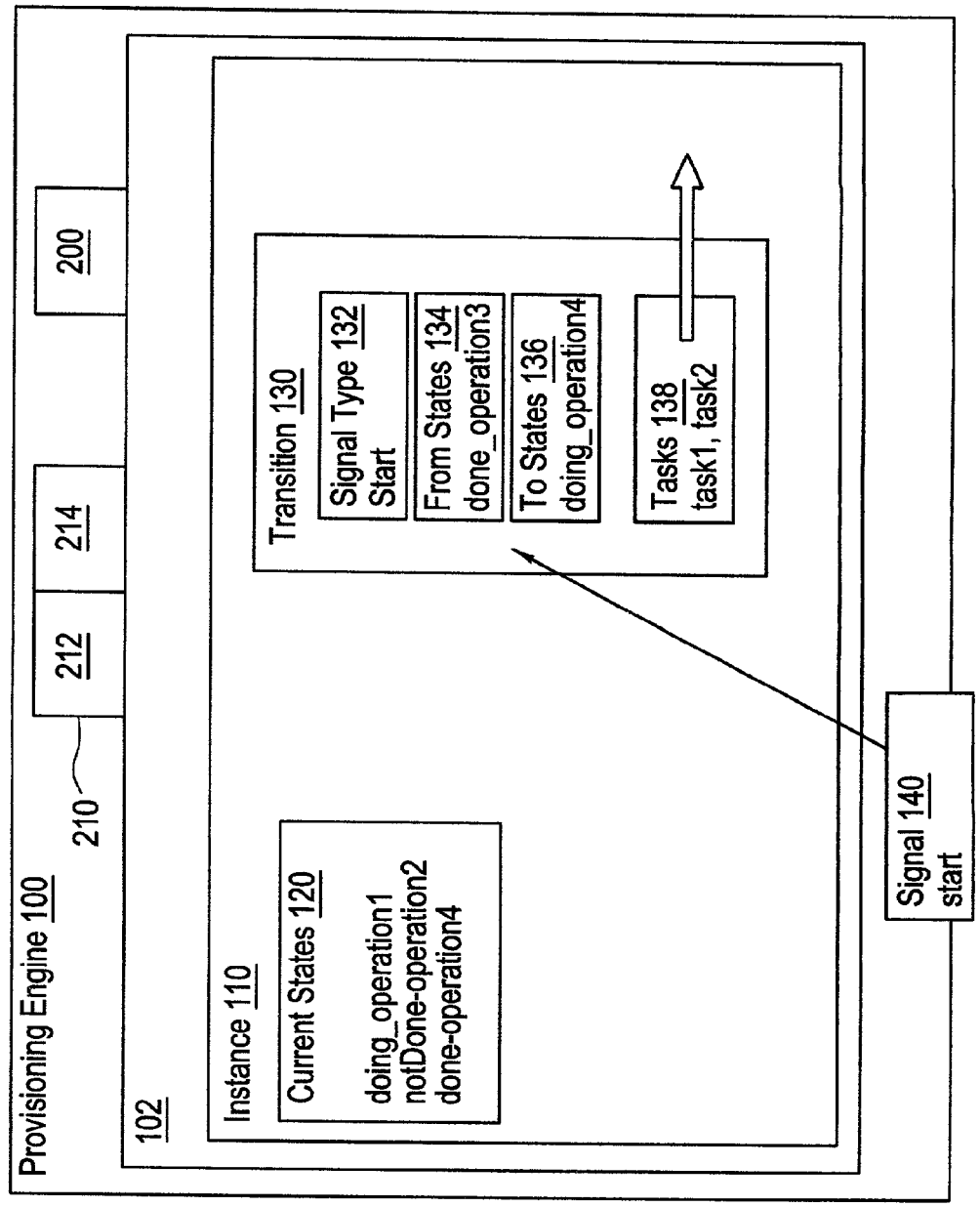
FIG. 2 is a block diagram of a provisioning engine of FIG. 1 illustrating the actions of an applicable transition in response to a signal.

Signals 140 (see FIG. 2) are commands sent to provisioning instances 110 that can be expressed as character strings, such as start, go, do, or undo. Signals 140 can be generated in various ways as described below. Signals 140 can trigger transitions 130 for controlling work process execution and flow. Transitions 130 (only one of which is illustrated in FIG. 1) define conditions under which states are added to and removed from the set of current states 120 of instance 110 and under which tasks defining work processes are carried out. Each transition comprises three elements; a signal type 132, a set of from states 134, a set of to states 136. Also transition 130 can include one or more tasks 138.

Every transition 130 has exactly one signal type 132. A given signal type 132, however, may be associated with any number of transitions 130. From states 134, and signal type 132, define the preconditions needed to apply transition 130. Transition 130 is applied if, and only if, its from states 134 are a subset of the set of current states 120 of instance 110 and signal 140 corresponding to the signal type 132 of transition 130 is received. When transition 130 is applied, its to states 136 are added to the set of current states 120 of instance 110 and its tasks 138 are executed to accomplish a particular work process of a provisioning process. Transitions 130 are defined by provisioning model 102. As a result, all instances 110 of the same model 102 will share the same set of transitions 130.

Whenever signal 140 is received by instance 110, instance 110 iterates through each of transitions 130 defined by the corresponding provisioning model 102. For each of transitions 130, if from states 134 are a subset of current states 120 and signal type 132 corresponds to signal 140, then transition 130 is "applicable." Applicable ones of transitions 130 are applied to instance 110 by removing from states 134 of the applicable transitions 130 from the set of current states 120, and then adding to states 136 of the applicable transitions 130 to the set of current states 120. Finally, each task 138 of applicable transitions 130 is executed. As an example of simple transition processing, consider the following Table 1 representing two transitions 130:

TABLE 1

| Transition No. | Type  | From States | To States | Tasks            |
|----------------|-------|-------------|-----------|------------------|
| 1              | Start | s           | a, b      | [Task 1 Task 2]  |
| 2              | Stop  | a, b        | done      |                  |

Transition No.1 above, indicates that whenever signal 140 of the type "start" is received, if the state "s" is a subset of the set of current states 120, then instance 110 should remove the state "s" from the set of current states 120, add the states "a" and "b" to the set of current states 120, and execute "task 1" and "task 2." Transition No. 2 states that whenever the signal 140 of the type "stop" is received, if "a" and "b" are both members of the set of current states 120, then, "a" and "b" will be removed from the set of current states 120, and the state "done" will be added to the set of current states 120. Note that the list of tasks 138 is empty in Transition No. 2 meaning that no tasks are accomplished after transitioning to the "done" state.

Processing of transitions 130 can be more complex than the example discussed in connection with Table 1. Specifically, provisioning engine 100 of the preferred embodiment ensures that no matter what order transitions 130 are processed in, the results will always be the same. This is accomplished by processing all applicable transitions 130 at one time, rather than iterating through them. A set of "remove" states is created by forming the union of all from states 134 of all applicable transitions 130. A set of "add" states is created by forming the union of all to states 136 of applicable transitions 130. A task list is then created by concatenating all tasks 138 of each applicable transition 130. Then, and only then, all remove states are removed from the set of current states 120, all add states are added to the set of current states 120, and all tasks 138 of applicable transitions 130 are executed.

The process of sending signals 140 to provisioning instances is called "signaling" herein. As described above, upon receipt of signal 140, applicable transitions 130 will be triggered to execute tasks 138 and modify current states 120. Many signals 140 are sent to instances 110 through the external API of provisioning engine 100. Such signals are typically used to initiate activity of instance 110 or to update instance 110 to reflect changing external conditions. Alternately, tasks 138 of transition 130 can generate and send signals 140 automatically. Regardless of where signals 140 originate, i.e. externally or internally, the signaling API call can look the same. For example, the signaling API of the preferred embodiment is expressed in simplified Java form below:

signal(String instanceId, String signal);

This code fragment represents an instruction to send signal 140 to provisioning instance 110 with the given identifier "instanceId". In practice, the signaling API permits association with an arbitrary number of arguments, expressed in the form of a dictionary, or map, with every signal. These arguments, referred to as "signal arguments" herein, are exemplified below:

signal(String instanceId, String signal, Map signalArguments);

When signal 140 of the format above is processed, if it causes tasks 138 to execute, then the executed tasks 138 will be given programmatic access to the contents of the map. This is a mechanism by which data from the outside world is communicated to provisioning instances 110. An executing task 138 is free to modify the contents of its "signal arguments" map. When task 138 finishes executing, the signal arguments, either modified or unmodified, are returned to the object generating or issuing signal 140 that caused triggering of transition 130 to execute task 138. Thus, the full form of the signal method is:

Map signal(String instanceId, String signal, Map signalArguments);

Accordingly, the return value of the signal API call, is the "signalArguments" argument, possibly modified from the time of the call by any tasks 138 which may have executed as a result of signal 140. Signal arguments can simply be a map containing key/value pairs. Although possibly defined in Java code or other ways, the notational convention of expressing a map within braces, "{ }", and separating each key from its associated value using a colon ":" can be used for clarity. As an example, consider the following map:

{supplier: "Acme Tools, Inc." address: "address: "2523 GlenWood Rd., Somewhereville"}

This map defines two entries, with the keys "supplier" and "address". In this example, the values of these keys are both strings, but this need not be the case. Values can be simple, scalar data types such as strings, integers, Boolean expressions, and floating point numbers, or they may be sets, lists, or other maps. The following example defines a map with one key:value pair, where the value is a list of sets:

{schedulingDays: [(Monday Wednesday Friday) (Tuesday Thursday)]}

Note the use of square brackets, "[ ]", to enclose a list, and the use of round brackets, "( )", to enclose a set. This notation, has been found to be useful in provisioning engine 100. When the API call for signal 140 is sent to provisioning instance 110, signal 140 ordinarily is sent to transitions 130 of instance 110 immediately. However, the preferred embodiment includes a second form of the API call for signal 140, referred to as a "schedule API call", which adds the ability to specify exactly when signal 140 should be sent. Such a form permits great temporal control and can be in the following form:

Map schedule(String instanceId, String signal, Map signalArguments,
long timeStamp);

This example adds the additional argument "timestamp" to signal 140. A time stamp is simply the time, expressed in milliseconds from a reference date, such as Jan. 1, 1970 UTC, when signal 140 should be sent. When provisioning instance 110 processes such an API call, instead of sending signal 140 to transitions 130 immediately, signal 140 and its arguments are placed in a persistent memory queue maintained internally by instance 110. Signal 140 will not be delivered to transitions 140 until the indicated time, which could be anywhere from milliseconds to years in the future after the API call for signal 140. The ability to schedule signals 140 at various times is a very powerful feature of engine 100 which aids greatly in the job of provisioning telecommunication services. For example, scheduling of signals 140 permits rescheduling of tasks 138 for re-execution in the event that one or more work processes fail initially because some network system is temporarily off line, malfunctioning, or otherwise not responding properly.

Note that the schedule API call returns a value similar to the simple signal discussed above. The value returned by the schedule API call, however, is simply a copy of the "signalArguments" input argument. The API call itself returns immediately, before any tasks which execute as a result of the call have had the chance to modify the argument. Tasks 138 have no way of knowing if they were executed as a result of an immediate signal 140 or a queued signal 140. In the case of a queued signal 140, however, because signal 140 may not be dispatched until some time in the future, task 138 may not execute until long after the schedule call has returned. So even if task 138 does modify arguments of signal 140, the API call of the queued signal 140 will never see those modifications.

As noted above, tasks 138 can be in the form of arbitrary units of Java code which execute in response to signal 140 rendering transition 130 applicable in instance 110. For example, tasks 138, in their most basic form, can be simply Java classes which implement a Java interface. Tasks 138, when in Java or any other standard code, are extremely easy to write, requiring only rudimentary knowledge of the code on the part of the developer. Tasks 138 can have a basic form which look something like the following with explanatory comments in brackets:

[declares variable of the type package called "myPackage"]

[imports a package which allows the programmer to use simplified names for packages and classes]

[defines class My Task to implement Task]

[This function is a public function named service. Being public means that it is publicly accessible, i.e., any object can call this function. A void function returns no value, simply performs operations. The parameter for this function is a variable of type TaskContext, named context. The { } simply denotes the beginning and end of groups of code to assist the compiler in parsing the code.]

package myPackage;

import com.multiflow.task. Task; import comm.multiflow.task. TaskContext;

public class MyTask implements Task {public void service (TaskContext context);

{//application specific code goes here}}

In this form, task 138 should import both Task and TaskContext from the com.multiflow.task package. The class of task 138 must implement the interface of task 138, which defines one method, service(TaskContext). When task 138 is run, execution begins at its service method. The method is invoked with a single argument, an object which implements the "TaskContext" interface. This object gives the task writer a rich API for working with engine 100, providing methods for examining and modifying arguments of signal 140, providing data for instance 110 and corresponding models, and for sending and scheduling signal API calls for signals 140.

As noted above, when defining provisioning model 102 for accomplishing a provisioning operation, tasks 138 are associated with transitions 130, and can be defined by specifying their fully-packetized Java class name in the form of a URL. Typically, this will be a file URL of the form:

file://myPackage.MyPackage

The URL protocol prefix, such as http:// or file://, may be omitted in the case of file:// URLs. Since tasks 138 each are defined by separate code, they can be loaded, unloaded and reloaded into provisioning engine 100.

Every provisioning instance 110 of the preferred embodiment maintains a data map which can be used for storing instance-specific data. This data map can take exactly the same form as the map structure used for passing signal arguments using the signal or schedule API calls. This interface permits querying, adding, modifying, or deleting entries in an instance's data map. Similarly, every provisioning model 102 has its own data map which can be used for storing model-specific data. Note that a model's data map is visible to all instances 110 of model 102. Typically, this map is used to store information which must be shared by all instances 110 of model 102, while a data map for an instance 110 will store information which is pertinent to only that particular instance 110.

As noted above, when signal 140 is sent to provisioning instance 110, signal 140 is accompanied by an arbitrary map of data, called the "signal arguments," which are made available to any tasks 138 which run as a result of signal 140. Tasks 138 have access to a second, similar set of transition arguments which is specified as part of the definition of transitions 130 of a provisioning model. More specifically, whenever task 138 is associated with transition 130, an arbitrary data map may be associated with task 138, as illustrated in Table 2 below.

TABLE 2

| signal | from | to  | tasks                      |
|--------|------|-----|----------------------------|
| go     | (x)  | (t) | [Task 1 {command:start}]   |
| finish | (x)  | (t) | [Task 1 {command:stop}]    |

In this example, Task1 is associated with two transitions 130. If Task1 runs as a result of an application of the first of transitions 130, Task1 will be supplied with the transition arguments {command:start}. If, however, Task1 runs as a result of an application of the second of transitions 130, Task1 will be supplied with the transition argument {command: stop}.

Transition arguments have two primary functions. First, transition arguments allow the programmer to specify a set of default arguments for task 138. For example, if task 138 doesn't find an expected key:value pair in its signal arguments, it can look in its transition arguments for a default definition. Second, transition arguments allow the developer to use the same task 138 to perform different functions in different transitions by specifying transition arguments which determine what function the task should do. Referring to the example of Table 2, the same task 138, i.e. Task 1, could be coded to perform some "start" operation in one case, and some "stop" operation in another.

The notation system described above is used extensively within provisioning engine 100 of the preferred embodiment. Accordingly, provisioning engine 100 includes parser 200, a software module for example, for reading the notation and converting it into data, such as Java data structures, or, conversely, for converting data structures into the notation.

A simple convention can be used to define signals in the notation. Recalling the signaling API discussed above:

Map signal(String instanceId, String signal, Map signalArguments);

The signalArguments of this API can easily be expressed in the convention, because they are simply a map. To express the instanceId and the signal, two new entries are added to the signalArguments map. The first new entry, keyed by the string "id", contains the instanceId arguments. The second new entry, keyed by the string "signal", contains the signal argument. Parser 200 of engine 100 includes logic which, when handed a notation map with the special keys id and signal defined, will turn the notation into the proper signal method call, and execute that method call. To illustrate, an example of signal 140 defined in the notation system is given below:

{id:someInstanceId signal:someSignal data1:someData

...}

Further, a second example, where signal 140 is scheduled for execution at some later time, is given below:

{id:someInstanceId
signal:someSignal
data1:someData
delay:1000L }

In the preferred embodiment, parser 200 determines whether this is a schedule call (i.e. a call to execute a signal at a scheduled time) or a signal call (i.e. call to execute a signal instantaneously) solely on the basis of the presence or absence of the delay key timestamp key or the like, which specify an offset, in milliseconds, from the current time before signal 140 will actually be sent or which specify an absolute time at which signal 140 will be sent. It is possible to program engine 100 entirely using the notation system for signaling. However, such programming can be less efficient than using the equivalent Java-based API or other API.

Accordingly, provisioning engine 100 of the preferred embodiment includes an extensible API 210, as a software module, which can be transported over a variety of different protocols, such as RMI (Remote Method Invocation), CORBA (Common Object Request Broker Architecture), DCOM (Distributed Component Object Model), and various socket interfaces. API 210 can be accessed entirely through the signal method discussed above. API 210 is comprised of admin API 212 for general administrative functions and core API 214 for instance-specific functions.

Admin API 212 is invoked by sending the "admin" signal to a special, predefined provisioning instance 110 called the "root instance". The root instance is automatically installed in provisioning engine 100 of the preferred embodiments, and is thus always available. The root instance defines the following transition:

[ admin ( ) ( ) [Admin]]

This transition is triggered by the "admin" signal. It has no from states 134 and no to states 136 and thus no conditions for execution other than receipt of the "admin" signal 140. Consequently, whenever the predefined root instance receives the "admin" signal 140, it will always execute the admin task 138. The admin task 138 itself can provide the entirety of admin API 212. Often, task 138 is designed to perform a single operation. The admin task 138, however, can be designed to perform a multitude of operations. The particular operations it performs is determined by the value of its "message" key. The admin task 138 simply extracts the value of this key, then dispatches to a method which implements the desired operation.

As an example, a signal which will list the ids of all models currently defined in an engine is below:

{id:root
signal:admin
message:getModels }

Many of the methods defined in admin API 212 expect additional arguments in addition to the "message" argument. The "setModelData" method, for example, which writes a key/value pair into a model's data map, expects the keys "modelId", key, and value:

{id:root
signal:admin
message:setModelData
modelId:someModel
key:aKey
value:(this is a set) }

Core API 212 is invoked by sending the "core" signal to any provisioning instance 110. Whenever a model is created, the following transition is always added to it:

[core () () [Core]]

This means that the core task 138 will execute whenever any instance in the system receives the core signal 140. Like the admin task 138, the core task 138 can implement a large number of operations, with the particular operations it performs determined by the value of the "message" key in its signal arguments map. As an example, a signal which will write a key/value pair into the model's data map is below:

{id:instanceId
signal:core
message:seData
key:aKey
value:[I am a list]}

Figure 3:
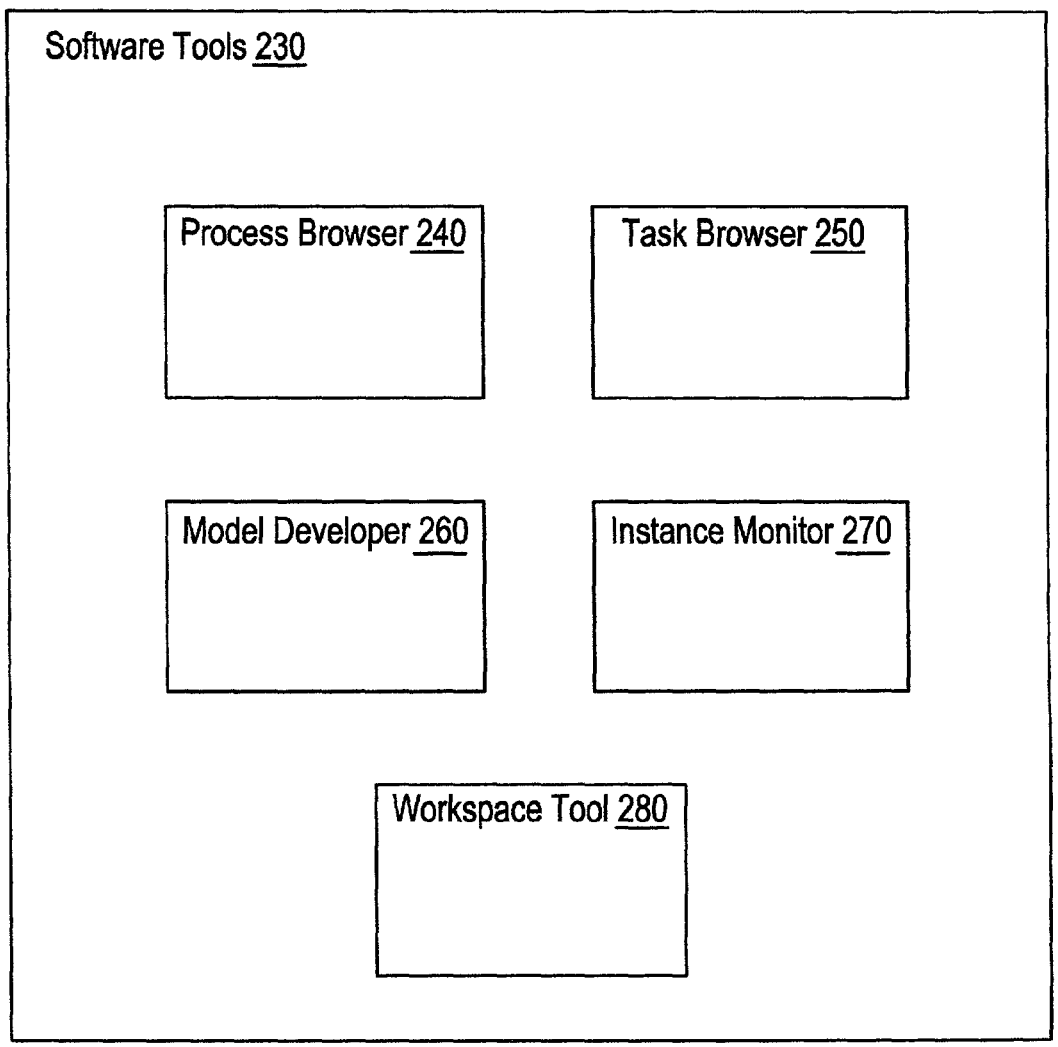
FIG. 3 is a block diagram of the software tools of the preferred embodiment.

The preferred embodiment also includes software tools 230 for providing a graphical user interface for provisioning engine 100 and for programming provisioning engine 100 in an object oriented manner using work process objects. As illustrated in FIG. 3, software tools 230 include process browser 240 (which allows a user to display defined models and instances 110 thereof, and interrogate the current state of any instance), task browser 250 (which allows a user to load and unload tasks 138 and to obtain information about loaded tasks 138), model developer 260 (which allows development of models using an object oriented approach for bundling common state machine function objects, into work process objects and manipulating the work process objects graphically to define a provisioning model, instance monitor 270 (which can be used to test, control, and monitor the execution of instances 110) and workspace tool 280 (which provides a mechanism by which commands can be invoked directly using the command language described above). Software tools 230 can be written in any appropriate programming language and can be ported to any appropriate operating system, such as Windows 95™, Windows 98™, Windows ME™ Windows NT™, Windows 2000™, UNIX, LINUX, or the like. Software tools 230 typically will be installed and run on a client computer communicating with the computer running provisioning engine 100 over a network.

Figure 4:
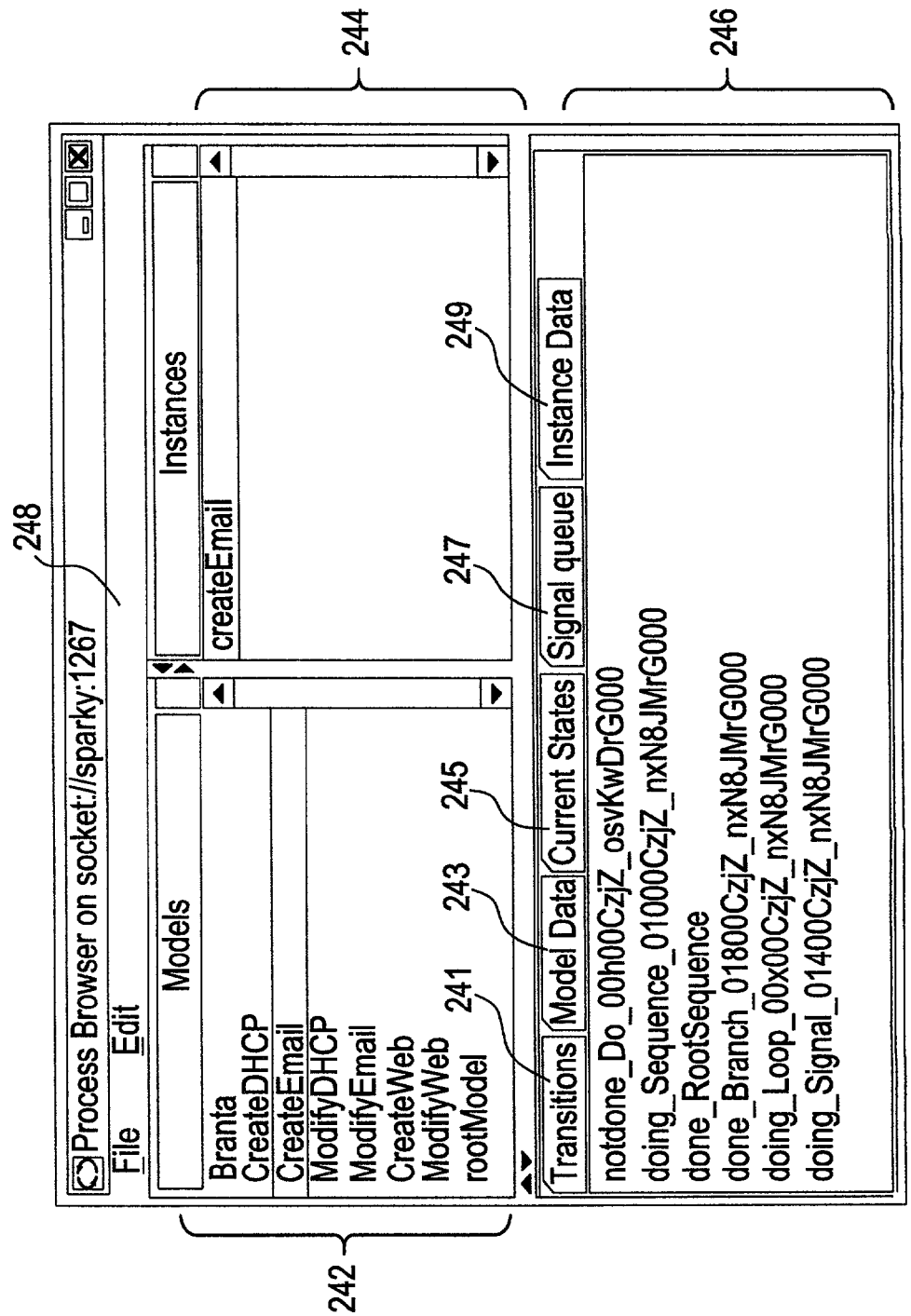
FIG. 4 illustrates a screen of the process browser of the preferred embodiment.

FIG. 4 illustrates a screen shot of process browser 240 which consists of list of models pane 242, list of instances pane 244, and information pane 246 presenting detailed information about the currently selected model 102 or instance 110. In accordance with the standard Windows user interface, menu bar 248 contains File and Edit menus. The File menu is divided into two groups. One group provides tools for the creation, deletion and editing of models and another group provides the same selections for instances. The Edit Menu can contain standard cut, copy, and paste selections for text editing.

A user may select model 102 from list of models pane 242, by mouse clicking on model 102, to examine the transitions 130 and data of model 102 or to launch model developer tool 260 (described in detail below) to edit the selected model 102. When model 102 is selected from list of models pane 242, the transitions 130 and data of model 102 are fetched from engine 100, and displayed under the transitions tab of information pane 246. Clicking on transitions tab 241 will display transitions 130 and data (in a character string in the form of the notation system disclosed above, for example) of model 102. Clicking on model data tab 243 will display the data of model 102 in the form of a tree viewer. For aggregate data types, the display will be an image consisting of braces ({n}) for maps, brackets ([n]) for lists and parentheses ((n)) for sets, where n is an integer indicating the number of elements in the aggregate. Further, individual instances 110 of the selected model 102 are fetched from the database, and displayed in list of instances pane 242.

Two other File menu items are dedicated to working with models 102. A "create model" item launches an input dialog requesting the URL of a model 102 to create. Typically, this will be a file URL indicating the path to a model which has been created using model developer 260. A typical file URL has the following form:

file://file_path (for example: "file://myPath/myModel.wdl")

Figure 5:
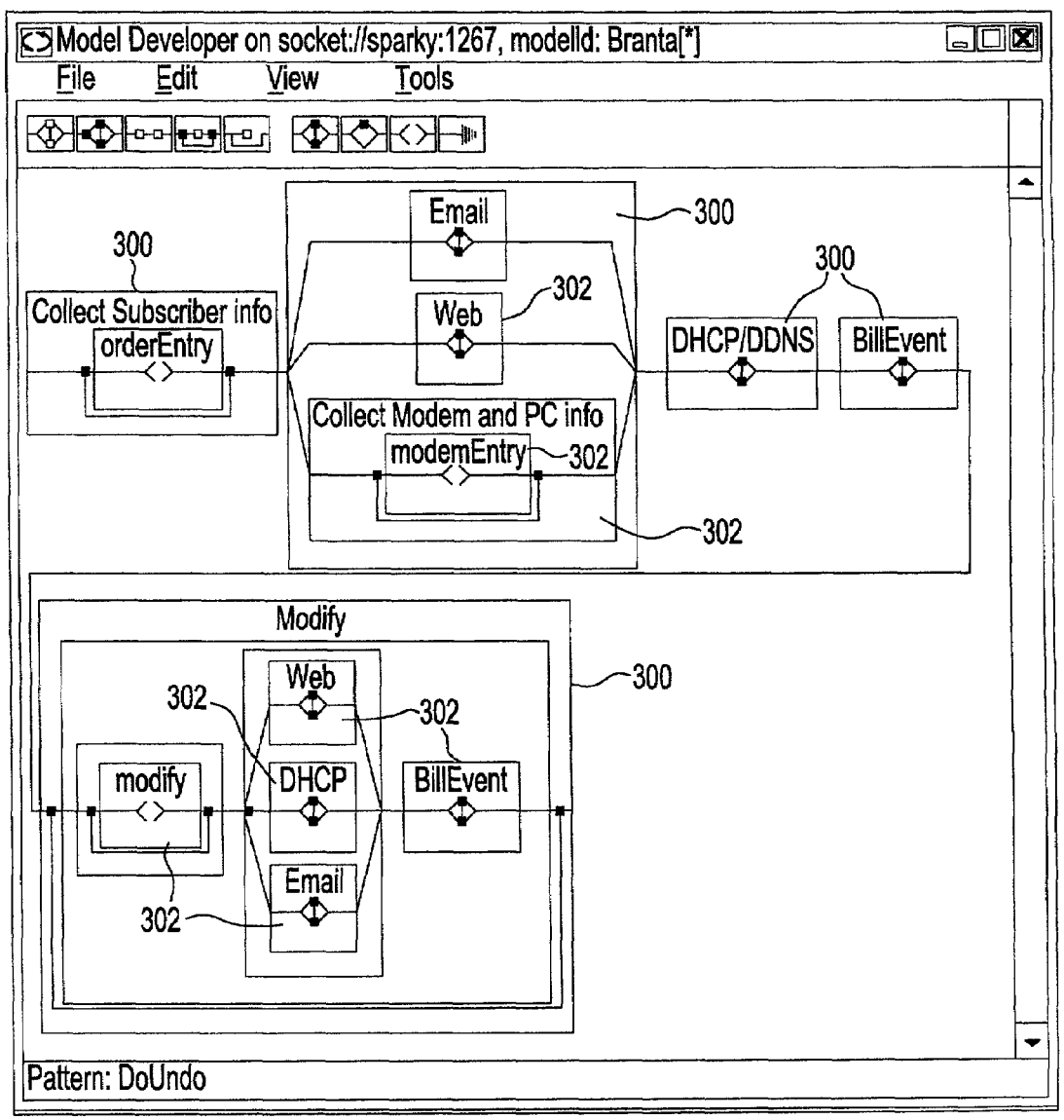
FIG. 5 illustrates a model display screen of the model developer of the preferred embodiment.

The variable "file_path" can be resolved on the file system of the server running provisioning engine 100, and not on the client machine's file system. If model 102 already exists in engine 100 with the given ID, a dialog box will ask the user whether or not to delete the previous model 102 before continuing. If model 102 already exists with associated existing instances 110, a dialog box will prompt on whether to delete instances 110 and model 102 before continuing. A "delete model" selection deletes the currently selected model 102. If this model 102 has existing instances 110, a dialog box will ask the user whether or not to delete them. To launch model developer 260 from process browser 240, the user can select "edit model" from the file menu. FIG. 5 is a screen shot from model developer 260 displaying provisioning model 102 in the form of interconnected icons each representing objects 300. Objects 300 in FIG. 5 are work process objects, i.e., state machine functions grouped to accomplish specific provisioning work processes such as setting up an email account. Note that some objects 300 are nested inside other objects and thus an referred to as "sub objects". Work process objects and arrangement thereof is described in detail below.

Figure 6:
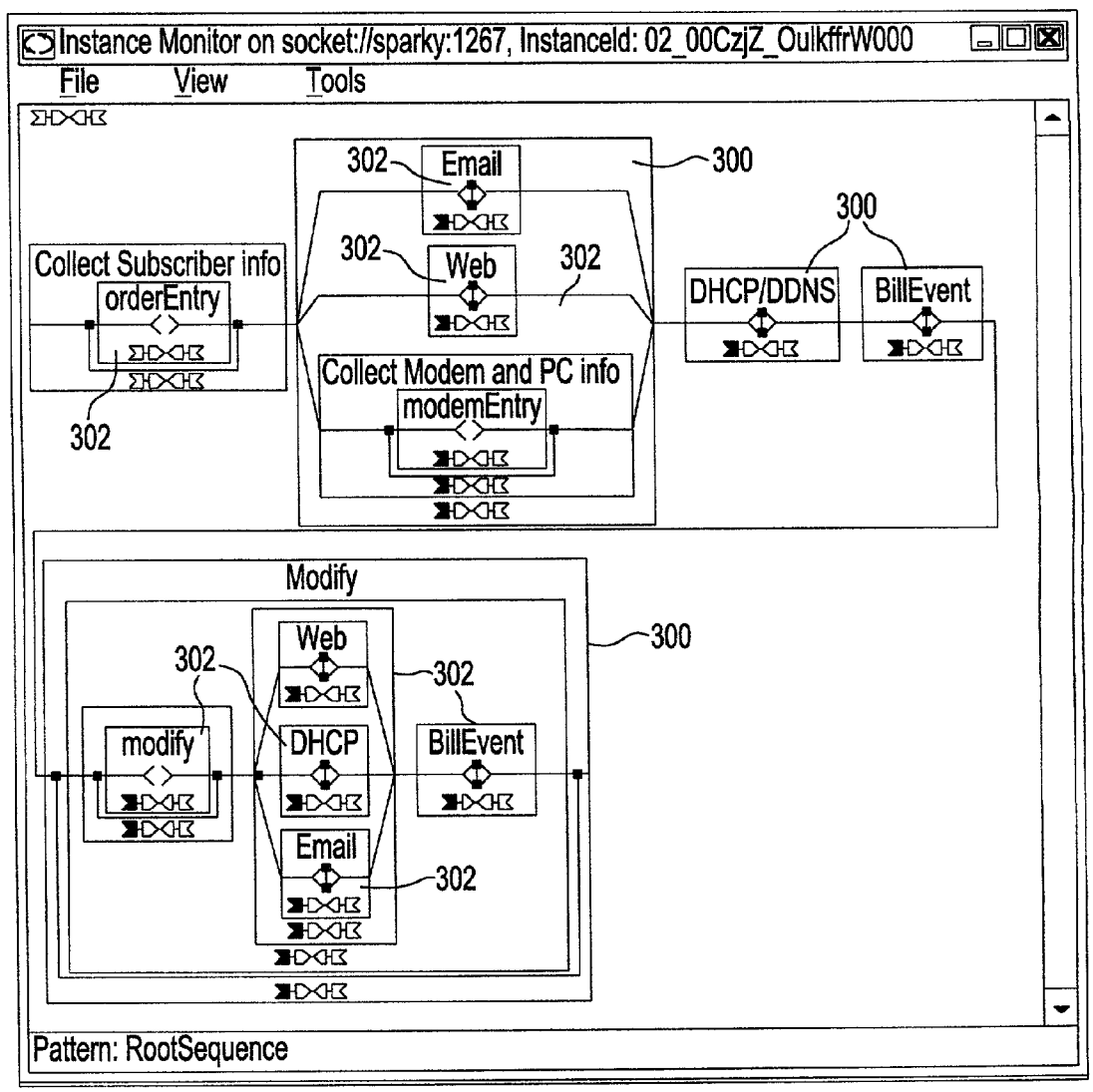
FIG. 6 illustrates a screen of the instance monitor of the preferred embodiment.

A user can examine data of instance 110 from list of instances pane 244. Selecting an individual workflow from the list of instances pane 244 with a single mouse click causes the data of the selected instance 110 to be read from engine 100 and displayed in information pane 246. For example, set of current states 120, transitions 130 and the status thereof, the signal queue, and data of the selected instance 110 may be displayed in a hierarchical, tree-structured view of the data, so that as little or as much of the data as desired may be viewed by expanding or contracting the branches. A "create instance" file menu item launches an input dialog box prompting entry of an id of the instance 110 to create. Instance 110 will be associated with the currently selected model 102. The dialog box can include a check box asking if the initialize signal should be sent to the newly created instance 110. A "delete instance" menu item will delete the currently selected instance 110. To launch instance monitor 270 for instance 110 (described below), the user can select instance 110 from instance list 244 and select "edit instance" from the file menu. FIG. 6 is a screen shot of instance monitor 270 illustrating instance 110 as interconnected objects 300 (work process objects) and their status as described below.

Figure 7:
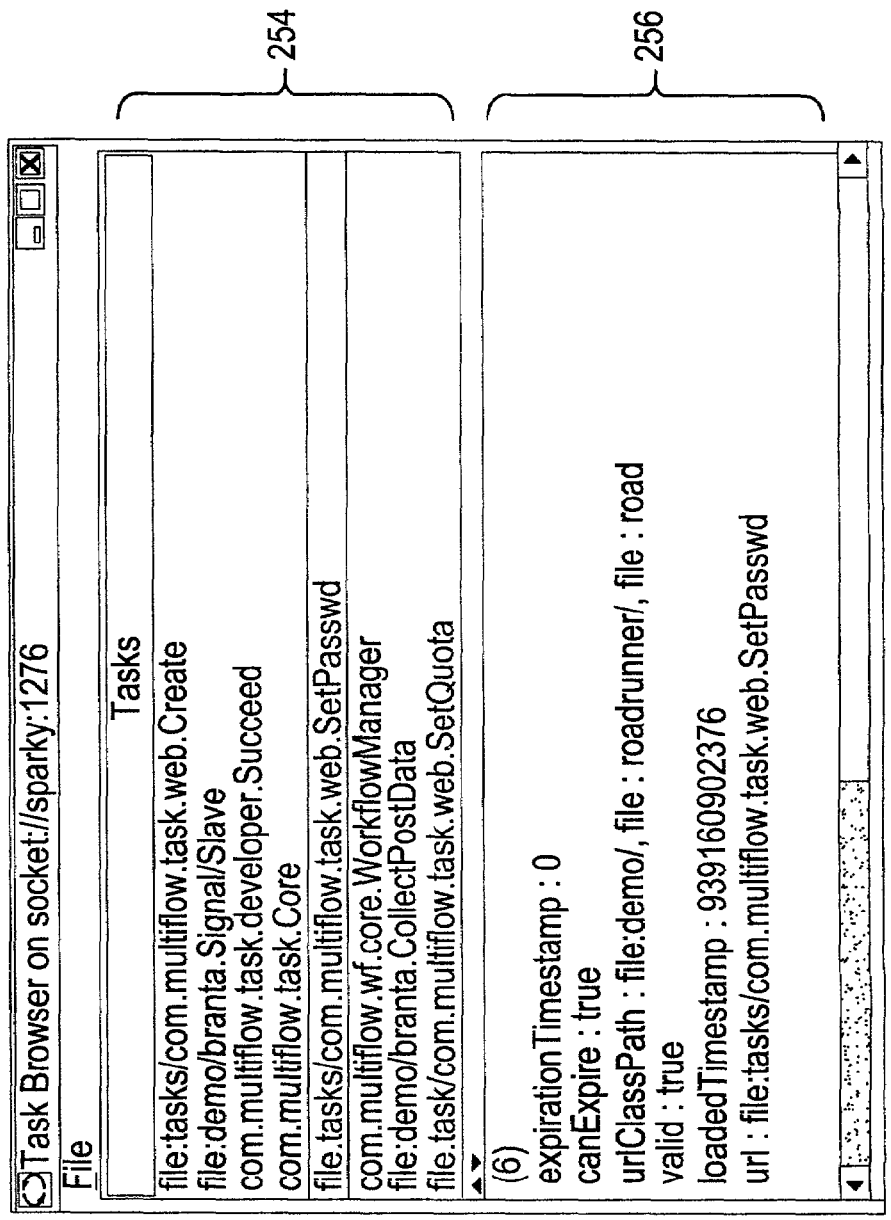
FIG. 7 illustrates a screen of the task browser of the preferred embodiment.

Task browser 250 is a tool for monitoring tasks 138. It allows tasks 138 to be loaded, and unloaded and is used to access information about currently loaded tasks 138. As illustrated in FIG. 7, the screen of task browser 250 consists of task list pane 254, which shows the list of tasks 138 in progress, and attributes pane 256 which shows attributes of each task 138 selected in task list pane 254.

The menu bar of task browser 250 contains a File menu with four menu selections: Load, Reload, Expire, and Close. Load and Reload are used to install or reinstall selected tasks 138. The "Expire" selection causes a selected one of tasks 138 to be deleted, i.e. unloaded. Close is used to close task browser 250. To load task 138 into instance 110, the user selects "Load" from the File menu and enters the class name of task 138 to be loaded as a URL in a dialog box. The URL can be in the following form, for example:

"file:d:/usr/xyz/multiflow/com.abc.task.Mytask"

To reload or unload task 138, the user selects "reload" or "expire", respectively, from the File menu. Task 138 may only be reloaded or unloaded if the value of the attribute "CanExpire" in the task map is true. As transitions 130 occur in a workflow, there are opportunities to execute user-defined tasks 138 which can be as varied as the programming language used for tasks 138, such as Java, allows. As noted above, tasks 138 can be arbitrary units of code that execute in response to an applicable transition 130 in a workflow. When using Java to program tasks 138, tasks 138 can be simply Java classes that implement the interface of tasks 138. Each user-defined action must conform to a set of constraints defined by the API described above.

As noted above, objects 300 representing state machine functions, can be assembled to create provisioning process workflows which behave similar to general-purpose programming languages in the sense that they begin executing at a given point and, unless some specific action is taken, execute sequentially until finished. Depending on the particular types of objects 300, the work flow may split into two or more independent work flows that repeatedly loop through a series of subobjects 302 nested in other objects 300 (both which are sometimes referred to as objects 300 below). Unlike programming language flow, control flow in the preferred embodiment can run both forward and backward. That is, once any workflow based on model 102 has accomplished some work it can back up, executing logic in reverse order to undo the work it has already done. This feature can be significant in telecommunications provisioning. Objects 300 representing state machine functions can be configured to accomplish any provisioning work process, such as setting up an email account, setting up a billing account, collect modem and PC information, DHCP configuration and the like. Also, to add flexibility and power to provisioning models, objects 300 can be configured as "do while", "or split" or other logical operations.

At any one time, object 300 will be in only one of the following four states: notDone (indicating that the work defined by the object has not yet been done); doing (meaning that any work defined by the object is currently being done); undoing (indicating that any work done by the object is currently being undone); and done (indicating the object's work is complete, and control has passed to succeeding objects 300). At any time, object 300 will respond to the signals "do_id" or "undo_id", where id is simply the id of object 300. If object 300 is in the notDone state when it receives do_id signal 140, it transitions into the doing state and begins the work process it is to accomplish. If object 300 receives do_id signal 140 while in the doing state, it continues its work. Similarly, if object 300 receives undo_id signal 140 while in the done state, it begins undoing anything it has done. If object 300 receives undo_id signal 140 while in undoing state, it simply continues undoing its work. Accordingly, the workflow through any instance 110 can be in either direction and provisioning work processes can be accomplished or undone.

Every time object 300 finishes its work process, it will transition from the doing state to the done state. Simultaneously, object 300 will send the signal "did_id" to the workflow to let other objects 300 know that it has finished. Similarly, each time object 300 finishes undoing its work, it will transition from the undoing state to the notDone state, and send the undid_id signal to the workflow. If object 300 receives a do_id signal 140 while in the done state, it simply sends the did_id signal 140, indicating that it has already accomplished the provisioning process. Similarly, if it receives an undid_id signal 140 while in the notDone state, it simply sends the undid_id signal, 140 indicating that it has finished undoing (or that it was never done in the first place). Finally, if object 300 receives the do_id signal 140 while in the undoing state, it transitions to the doing state, and begins its work process. Similarly, an undo_id signal 140 while in the doing state causes a transition into the undoing state, and causes any undoing logic to begin execution.

Provisioning models 102 of the preferred embodiment first receive an initialize signal before anything else is accomplished. The initialize signal initializes every object 300 to the notDone state and sends the do_id signal to the root sequence. This will cause the root sequence to enter the doing state and begin its work process. Specifically, it will send the do_id signal to the first object 300 in the configuration of the model, causing the first object 300 to enter its doing state and to start its work process.

Figure 8:
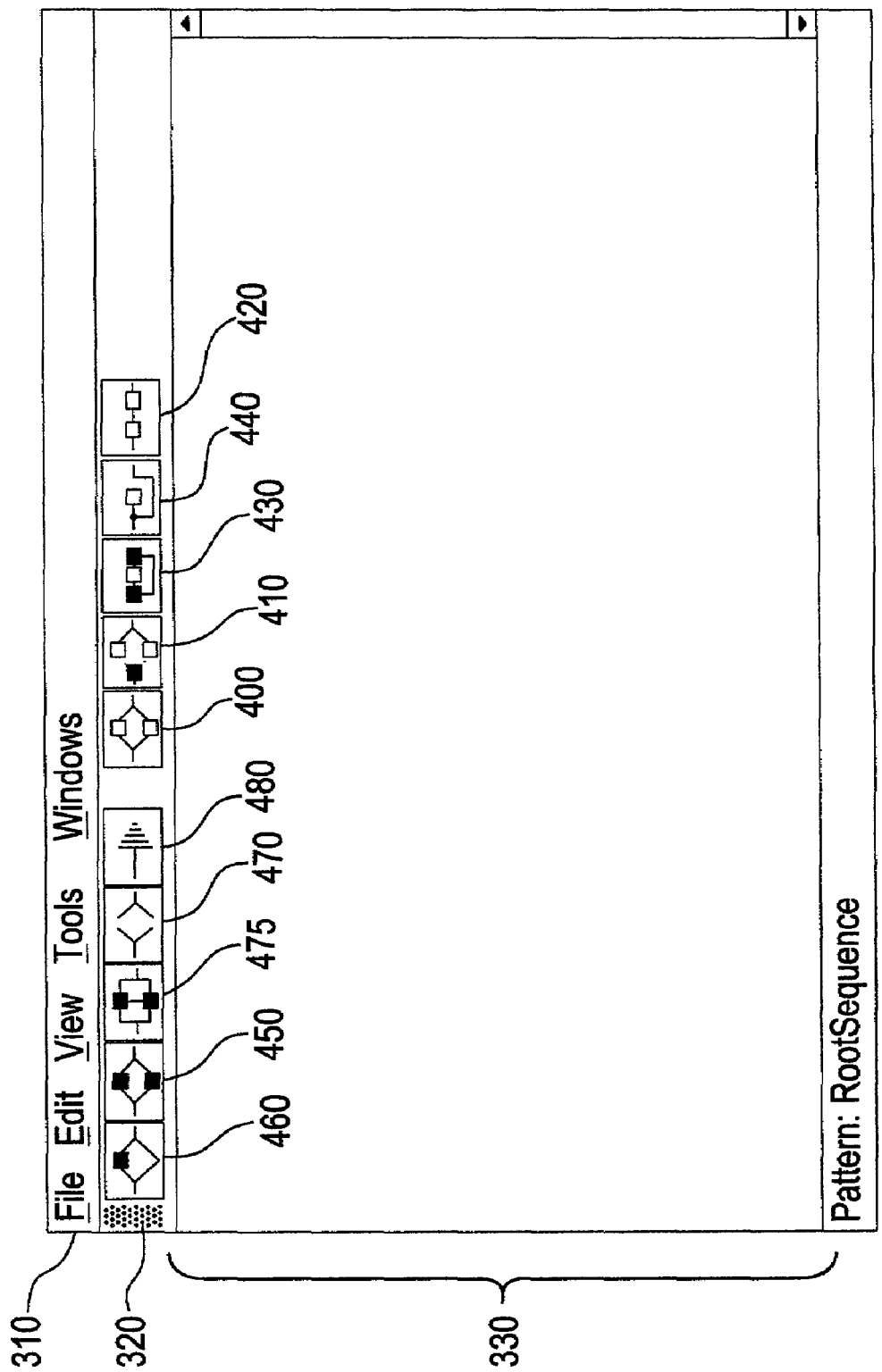
FIG. 8 illustrates a model developing screen of the model developer of the preferred embodiment.

Provisioning models are 102 developed with a pattern language using model developer tool 260 to assemble objects 300 representing state machine functions into the desired workflow for accomplishing the desired provisioning work processes. FIG. 8 illustrates a model developing screen of model developer 260. The model developing screen includes menu bar 310, object tool bar 320, and workspace 330. Menu bar 310 contains File, Edit, View, and Tools menus. The File menu contains new, open, save, and save as menu items for creating, opening and saving provisioning models to and from a file system. The Open Model selection allows access to models 102 installed in an engine server's database. The Install Model selection causes model 102 to be loaded into the database, where the model becomes available for use in creating new instances. The View Menu has only the Show Structure selection which is a toggle that enables and disables the display of the structure of the model. The Tools menu permits selection of the other software tools.

Object toolbar 320 contains plural icons each representing the set of available objects 300 for building models 102. Objects 300 are groups of state-machine operations, i.e. transitions 103 that perform a particular logic function. Objects 300 can be configured to accomplish a particular work process by associating signal types 132, tasks 138, and other parameters therewith as is described below in connection with FIG. 9. AndSplitAndJoin object 300, represented by icon 400, receives a do_id signal, it sends do_id signals to each of its subobjects 302 (i.e. objects that are nested within AndSplitAndJoin object 300), which will then execute their functions in parallel (the "and split" part of the operation). AndSplitAndJoin object 300 will not pass on control until all of its subobjects 302 have entered the done state (the "and join" part of the operation). Only then will AndSplitAndJoin object 300 send the did_id signal 140. Undoing an AndSplitAndJoin object 300 simply reverses this logic. Parallel execution, as referred to herein, means that subobjects 302 will execute independently of each other with no sequential constraints between them. It does not necessarily mean that all subobjects 302 will actually execute simultaneously.

OrSplitAndJoin object 300, represented by icon 410, works like a switch that passes control to selected immediate subobject 302 from a given set of subobjects 302 (the "or split" part of the operation). Each of the selected immediate subobjects 302 then receives a do_id signal 140. Each selected immediate subobject 302 must then complete their execution before the OrSplitAndJoin object 300 itself sends the did_id signal 140 (the "and join" part of the operation). When undoing, only those subobjects which are in doing or done states will receive the undo_id signal. An OrSplitAndJoin object 300 has a unique property referred to as Select-Task herein. SelectTask is a task 138 that is executed to determine which subobjects 302 are to receive control. When executed, SelectTask is passed as a map, called the signal-Map, which can be used to determine the display names of all subobjects 302 of an object 300. This map is obtained by extracting the SignalMap key from the transition arguments of task 138.

Sequence icon 420 represents an object 300 used to transfer control sequentially from one subobject 302 to the next subobject 302. When a sequence object 300 receives the do_id signal 140, it sends a do_id signal to each of its subobjects 302 in turn. Each subobject 302 then must complete its work, transition to the done state and send the did_id signal 140, before the next subobject 302 can receive its do_id signal 140. Similarly, when a sequence object 300 receives the undo_id signal 140, it sends an undo_id signal 140 to its last subobject 302, then to the preceding subobject 302, and so on, until the entire work of sequence object 300 has been undone.

The Loop icon 430 represents object 300 that is roughly analogous to common looping constructs found in many programming languages. Typically, such loops repeatedly evaluate some conditional logic to determine whether to execute the body of the loop. If the conditional logic is true, the body is executed. If the conditional logic is false, the body is not executed, and control continues after the loop. The conditional logic in the case of a Loop object 300 is provided by one or more tasks 138. The body of a Loop object 300 consists of one or more subobjects 302. Depending on how the Loop object 300 is configured, it will behave like a do loop, with conditional logic before the loop's body, or like a while loop, with conditional logic at the end of the loop's body. Unlike a do loop, the while loop always executes its body at least once. To create a do loop, task 138 is specified as the value of the pre task of object 300. Alternately, to create a while loop, task 138 is specified as the value of the post task property of object 300. In either case, task 138 can contain code which sends a specific succeed or fail signal 140. If the succeed signal is sent, then loop execution will continue by sending the do_id signal to the loop body. If the fail signal is sent, loop execution terminates. Briefly, a pre task is a task 138 that executes prior to an object 300 entering the doing state and a post task is a task that executes after an object 300 enters the done state. In the case of loop type object 300, a pre task defines a property and in which the loop will execute in a do loop and a post task defines the property in a do while loop.

Branch icon 440 represent object 300 that causes the workflow to split into two separate, independent execution paths. The main path leads to object 300 that follows branch object 300 in model 102, while the other path leads to subobject 302 of branch object 300. Unlike AndSplitAndJoin object 300, the two paths after branch object 300 never rejoin. DoUndo icon 450 represents object 300 used to execute a single provisioning action. Unlike Do object 300 described below, DoUndo object 300 is used in cases where a specific action might be needed to undo the provisioning action after it has been executed. If, for example, the provisioning action is to write a record in a database, then its corresponding undo action might be to delete the record. DoUndo object 300 defines two tasks 138; a doTask and an undoTask. These tasks work similarly to the doTask defined on Do object 300. Both are required to schedule either a succeed signal 140 or a fail signal 140. If the undo task fails, it is rescheduled for later execution.

Do icon 460 represents object 300 used to execute a single provisioning action. It defines a single property, called the "doTask," which contains the code to execute the provisioning action. The doTask must contain code which sends a specific succeed or fail signal, 140 depending on whether or not the provisioning action is successful. If the succeed signal 140 is sent, Do object 300 enters the done state and sends the did_id signal 140. If the provisioning action fails, however, Do object 300 will schedule the fail signal 140, which will cause the doTask to execute again at some future time. Typically, in the failure case, the fail signal 140 will be scheduled for some time in the future, using one of the asynchronous signal messages discussed above (i.e., scheduleAt or scheduleDelay). Actions of Do object 300 are not "un-doable." Specifically, once Do object 300 enters the done state, it cannot be undone as most other process objects can. An exception to this rule is if Do object 300 is a subobject 302 of a loop. Typically, Do object 300 is used for actions that will never need to be undone. For example, to return the URL of a web page to a web server.

Signal icon 470 represents object 300 designed to interrupt the flow of execution of objects 300 until signal 140 of a specific signal type 132 is received from some external source. Typically, this source is some external client application communicating with provisioning engine 100 through a network-based transport mechanism. When signal object 300 is in the doing state, it will do nothing until the expected signal 140 is received. The particular signal type 132 that signal object 300 expects to receive is the value of the doSignal property of signal object 300. By default, this is set to the string "go", though it can be set as is appropriate for the actions to be accomplished. If the doSignal property is set to the empty string, " ", then signal object 300 will behave differently. Instead of blocking execution until the doSignal's value is received, the flow of control will continue through process object 300. More specifically, if the doSignal is the empty string, and if signal object 300 receives the do_id signal when in state notDone, it simply transitions to the done state and issues the did_id signal.

Signal object 300 also defines an undo signal property. If this property is defined, then the flow of process execution will block at signal object 300 until signal 140 with this value is received. If the property is not defined, signal 140 is automatically undone. That is, if it is sent the undo signal 140 while in done state, it will simply transition to state notDone, and send the did_id signal 140. The transition on an external signal will only occur if signal object 300 is in doing state (for the doSignal) or in undoing state (for the undoSignal). If instance 110 receives the given do (undo) signal 140 while signal object 300 is in notDone state (or done state), signal 140 will be ignored. More simply stated, this means that signal object 300 will only react to the signal 140 if it has been "armed", i.e. if execution has passed to it.

Terminal icon 480 represents an object 300 that terminates the flow of execution of objects 300. When terminal object 300 receives the do_id signal 140 it immediately transitions to the state done, but does not issue the did_id signal 140. If terminal object 300 is part of a sequence, once terminal object 300 is executed, nothing following it in the sequence will be executed. Note that tasks 138 discussed above, such as DoTask, can be a single task or a set of plural tasks 138 as described above.

Figure 13:
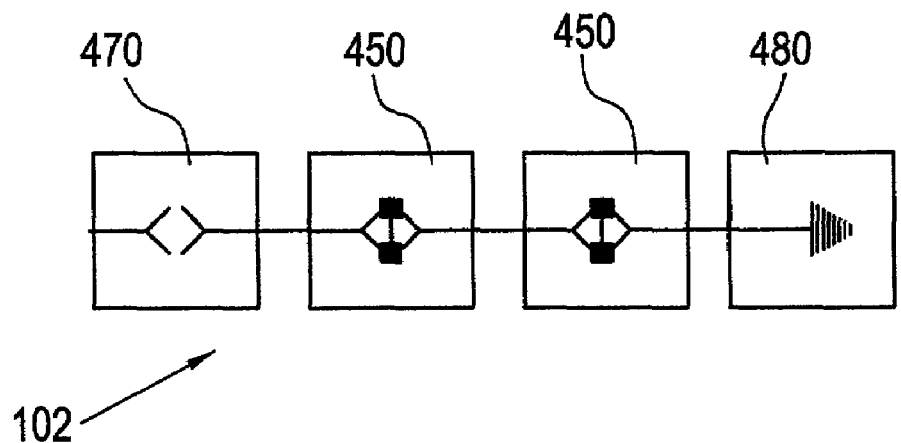
FIG. 13 illustrates a simple model in accordance with the preferred embodiment.

Subinstance icon 475 is used to create subinstances. FIG. 13 illustrates an example of subinstance 800 in accordance with the preferred embodiment. Subinstances 800 are similar to models 102 and are constructed of objects 300. However, subinstances 800 can be called remotely from instance 110 of model 102 and thus provide tremendous flexibility, distribution, and efficiency in programming and provisioning. For example, subinstances 800 can be called from a plurality of instances 110 and thus facilitate code reuse. Further, subinstances 800 can easily execute in their own thread and thus provide concurrency, i.e. multitasking. The use of subinstances 800 allows complex provisioning processes to be broken down into smaller, more manageable functional units. Once defined, these units, i.e. subinstances 800, can be instantiated and signaled from other executing instances 110.

Specifically, subinstance 800 is an instance of model 102 that is instantiated and signaled indirectly from some invoking instance 110. All instantiation and signaling logic is embodied in a subinstance object embedded in the invoking instance 110. Any model 102 can be instantiated as subinstance 800 from any instance 110. Subinstance 800 may be thought of as a group of objects 300 that have been removed from their model 102 and executed as an independent unit. FIG. 13 illustrates a simple example of model 102 containing four objects 300 represented by signal icon 470, two DoUndo icons 450, and terminal pattern icon 480.

Figure 14:
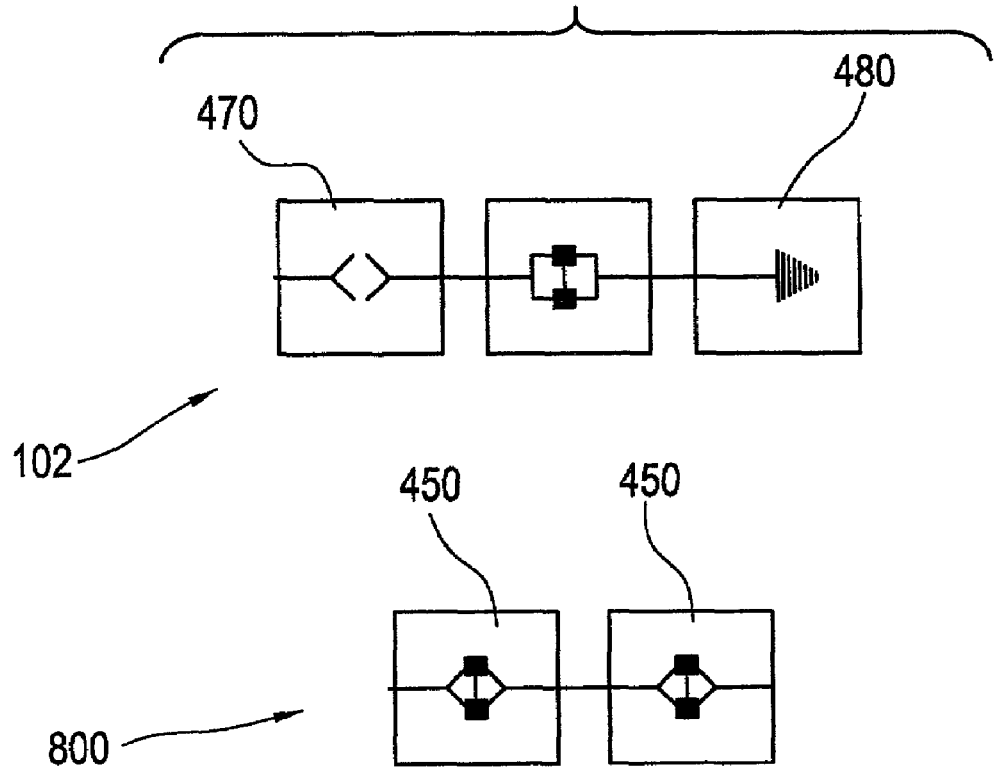
FIG. 14 illustrates a simple model and subinstance that are equivalent to the model of FIG. 13.

FIG. 14 illustrates model 102 having equivalent functionality to model 102 of FIG. 13, but which has been decomposed into two separate models 102. The first model 102 contains subinstance icon 475 (representing subinstance object 300) in place of the two DoUndo icons 450. The second model 102 consists of the original two DoUndo icons 450, now factored out of the original model 102 to run as subinstance 800.

Any model 102 can be used as a subinstance 800; no special coding in model 102 is required. Consequently, a given model 102 can be executed both as instance 110 and as subinstance 800, depending on circumstance. Instance 110 is considered subinstance 800 whenever it is called, i.e., created, by the transitions of subinstance object 300 in an other instance 110. Note that subinstances 800 are transient. They are created automatically from models 102 whenever their invoking instance 110 transitions into the doing state, and removed automatically whenever their invoking instance 110 transitions into the done state.

More specifically, the life cycle of subinstance 800 begins whenever a subinstance object 300 receives a Do signal. Subinstance object 300 enters its doing state, then examines its subinstance URL (described in detail below) to determine what model 102 to instantiate, i.e. call for execution, and what network service to call to do the instantiation. In many cases, subinstance 800 will be instantiated on the same provisioning engine 100 as model 102 having the invoking subinstance object 300, but the use of a URL to define the subinstance 800 allows subinstance 800 to be instantiated remotely on any appropriate provisioning engine 100.

As soon as subinstance 800 is instantiated, its root instance is sent initialize signal 140. Transitions 130 in the root instance set all objects 300 in subinstance 800 to the notDone state, then send the do signal to subinstance 800 to start its execution. The invoking subinstance object 300 remains in the doing state until the root instance of subinstance 800 transitions to the done state. At this time, the invoking subinstance object 300 will enter its own done state and remove the invoked subinstance 800.

Any do or undo signals received by the invoking subinstance object 300 while it is in its doing state are relayed to the invoked subinstance 800. With respect to these two signals, the invoked subinstance 800 behaves exactly as if it had been coded in-line in the invoking instance 110. When the root instance of subinstance 800 enters the done state, it signals its invoking instance 110, causing it to enter its own done state. The invoked subinstance 800 has now finished its work, and it is removed by signal 140 from the invoking instance 110.

Subinstance objects 300 respond to undo signals in a manner that reverses the above logic. Whenever subinstance object 300 transitions to its unDoing state, it creates subinstance 800 as an instance 110 of designated model 102. Subinstance 800 is executed with a deinitialize signal, setting all its patterns to the done state, then sending the invoking instance 110 the undo signal. Finally, when the root instance of subinstance 800 enters the notDone state, subinstance object 300 enters its own notDone state and removes subinstance 800.

Signals 140 that control subinstance 800 of the preferred embodiment are subject to the same security mechanisms as all signals 140, as described above. This means that before subinstance object 300 can create subinstance 800, it can authenticate with the engine 100 on which subinstance 800 will execute. In the case of a local subinstance 800 running on the same host as invoking instance 110, this is a fairly straightforward process because invoking instance 110 can simply pass its own security credentials to create subinstance 800. For a remotely executing subinstance 800, however, subinstance 800 must send an explicit authenticateUser signal to establish its credentials.

Model Developer 260 can include objects 300 that contain transitions 130 to handle the security mechanisms transparently, i.e., without further programming or configuration. In the preferred embodiment, the configuration map arguments of engine 100 can define two keys, subinstancelogin and subinstancepassword, that subinstance object 300 can use to authenticate against (potentially remote) engine 100, as shown below:

subinstancelogin:{value:someUserId}
subinstancepassword:{value:somePassword}

This login and password pair can also be used by subinstance 800 to authenticate against engine 100 of invoking instance 110. It follows that all engines 100 that will be signaling each other through subinstance 800 should have identical values for these keys, and these keys should represent valid login/password pairs for all these engines 100. In many cases, subinstance 800 will require input data from invoking instance 110. Similarly, after subinstance 800 has finished executing, subinstance 800 may well have output data that needs to be returned to invoking instance 110. In both cases, such data may be passed on to the signal arguments in the manner described above.

To pass data to subinstance 800, input data may be written to the signal arguments in the invoking instance 110 before subinstance object 300 transitions into the doing state. Any convenient task 130 in the invoking instance 110 that executes prior to this point can perform this function, though subinstance object 300 can include a pre task that is specifically designed for this purpose and that will execute just before subinstance 800 is created.

Any data in the signal arguments of invoking instance 110 at the time its subinstance object 300 transitions to the doing state can be copied into the signal arguments of the invoked subinstance 800. This data is then available as signal arguments to the first task 138 of subinstance 800. Of course, if this task 138 propagates its signal arguments, then the data will be available to succeeding tasks 138 also. A pre task is operative to populate the signal arguments as required by subinstance 800. To pass output data from subinstance 800 back to its invoking instance 110, that data must be defined in the signal arguments when subinstance 800 finishes execution, i.e., when the invoked root instance of subinstance 800 transitions into the done state. In the invoking subinstance object 300, the first task 138 to execute after subinstance object 300 enters its done state will find the data in its signal arguments.

The Post Task of subinstance 800 is a convenient place to locate such a task 138. If non-null, the Post Task will execute after subinstance object 300 transitions from the doing state to the done state, and immediately before subinstance 800 is removed. Any data written in the signal arguments of subinstance 800 when its root instance transitions into the done state will be available to the signal arguments of post task.

As with the pre task, the subinstance 800 post task should not itself send succeed or fail signals. Its sole purpose is to capture the signal arguments as required by subinstance 800. The sequencing provided by succeed and fail signals is provided implicitly by transitions defined in the subinstance object 300.

By default, model developer installs the following default value for the subinstance object 300 post task property:

com.widget.taskCore {message:apply}

This message looks in the signal arguments for the keys instance: and model:. If either are defined, their value is taken as a list to be applied to the instance data map and/or model data map of invoking instance 110. This technique functions as a bridge between the signal arguments of invoked subinstance 800's and the model data map of invoking instance 110. It allows data and results computed in subinstance 800 to easily modify the instance data map and/or model data map corresponding to invoking instance 110.

Figure 15:
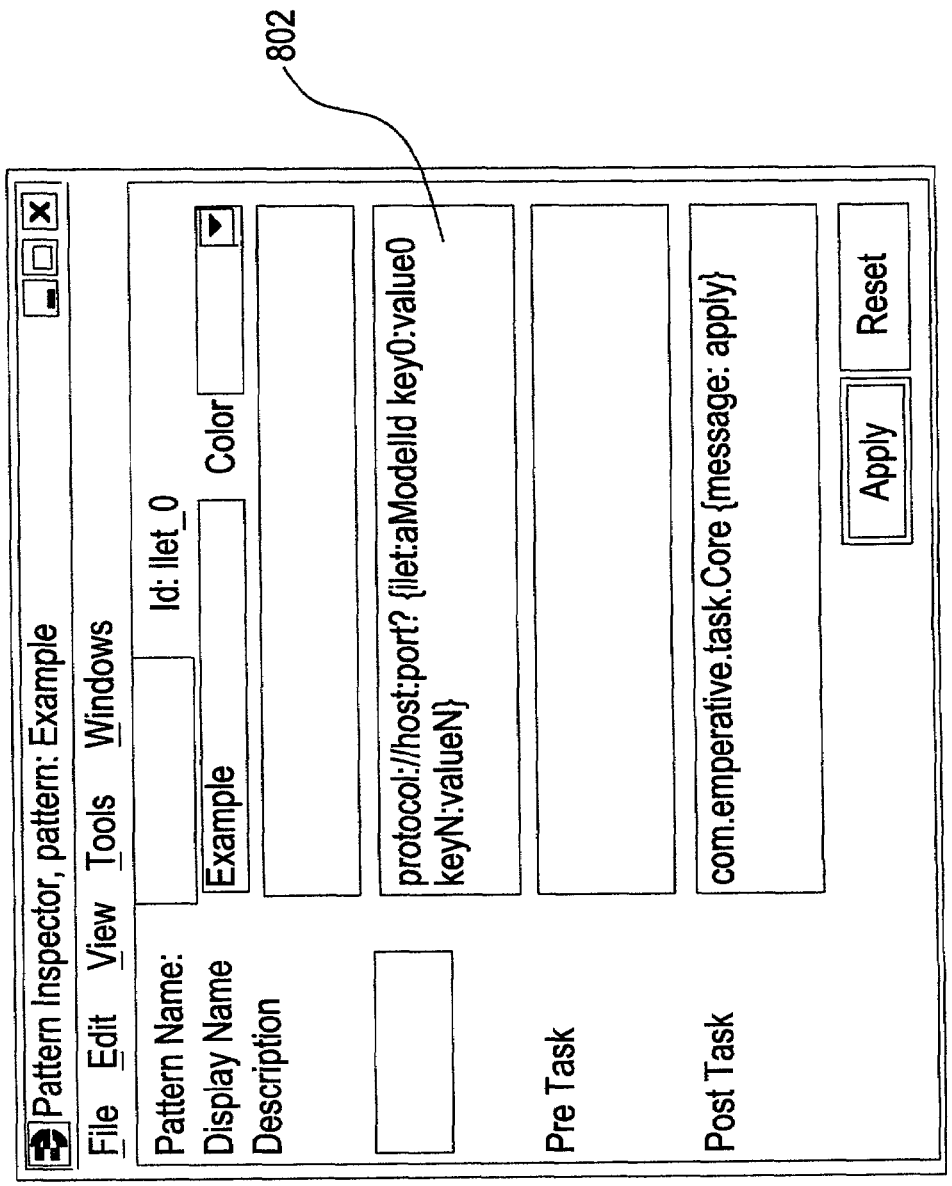
FIG. 15 illustrates a pattern inspector screen of the model developer of the preferred embodiment.

In model developer 260, each subinstance object 300 can be configured using the pattern inspector screen illustrated in FIG. 15 with subinstance URL 802 designating the model 102 to be run as subinstance 800. The protocol, host, and port portions of subinstance URL 802 designate an engine service, and thus the host engine 100 on which subinstance 800 will execute. Subinstance 800 itself is defined in a data map specified as the query string of subinstance URL 802. This data map may contain the string-valued key designating the model 102 of subinstance 800. Any other key:value pairs present in the map are ignored by the engine, but are available to the instantiated subinstance 800 for application-specific use.

In engine 100, the protocol portion of subinstance URL 802 always defaults to local. As a result, the subinstance URL 802 to be created in the same engine 100 as its invoking instance 102 need only specify a query string stock as the following:

?{subinstance:aModelId}

In many cases, subinstance URL 802 can be conveniently specified using the "prp:" pseudo-protocol. This protocol is resolved by using the file portion of subinstance URL 802 as a key in the configuration arguments of engine 100 then looking up the associated value, as shown below:

prp URL: pro:somekey
ConfigArgs: someKey:{value:"socket://sparky:1067?{subinstance :aModelId}"}

The prp: psudeo protocol provides a form of indirection, leaving the ultimate specification of the implementing model 100 of subinstance 800 to the configuration arguments mechanism. It is even possible to have a prp: URL resolve to another prp: URL, providing double (triple, quadruple, etc.) indirection. To prevent infinite loops, the engine can limit the total number of such indirections to ten a devised value, for example.

Subinstance URL 802 can be specified in the pattern inspector window for the corresponding subinstance object 300. However, it is also possible to specify subinstance URL 802 dynamically in code of task 138. If the key com.widget.util.EngineCostants subinstance URL is defined in the signal arguments, during the transition of subinstance object 300 transition from notDone to doing, then the signal arguments definition will take precedence over the subinstance URL property set in the pattern inspector. In most cases, this will be done by setting the signal arguments key in the pre task of subinstance object 300.

In engine 100 of the preferred embodiment, every instance 102 is single-threaded. Even when tasks 138 are embedded within OrSplitAndJoin or AndSplitAndJoin object 300, they do not necessarily execute in parallel (though if any of tasks 138 in a split branch should fail with a scheduled retry, control will transfer immediately to one of the other branches). This semantic simplifies the job of the programmer. Notwithstanding this, the invention can have multi-thread capability.

Subinstance 800, however, provides model 102 of the preferred embodiment the capability of true concurrency, i.e., multi-threading, because each invoked subinstance 800 executes in its own thread. Replacing the Do and DoUndo objects of one of the split objects 300 with subinstance 800 takes advantage of concurrency.

All of the signaling that takes place between subinstance object 300 and its invoked subinstance 800 is asynchronous in the preferred embodiment. This greatly mitigates the possibility of both distributed and non-distributed thread deadlock. Whenever a user-defined task 138 in subinstance 800 calls its invoking instance 102 with a synchronous signal, thread deadlock becomes a real possibility. For this reason, it is preferable that all communication between subinstance 800 and other instances 102 take place through the signal arguments as described above.

Workspace 330 is where models 102 are actually constructed with the pattern language of objects 300. When a user clicks on an icon in tool bar 320, the cursor changes to a crosshair or other indicator that an icon representing an object 300 has been selected. Clicking inside workspace 330 will cause the corresponding object 300 to be inserted into model 102. Models 102 may be viewed with the underlying structure either shown or hidden. When the structure is shown, model 102 is displayed as a series of stacked rectangles as illustrated in FIGS. 5 and 6. Alternately, this structure can be hidden for a different view of the underlying model, such as that discussed below in connection with FIG. 9. The Hide Structure/Show Structure button on the Tools menu permits toggling between the two views.

The sequence of objects 300 may be rearranged in model 102 by mouse-clicking and mouse-dragging objects 300 around to desired positions in workspace 330. All layout in workspace 330 is automatic. In particular, when the mouse button is released after a drag operation, model developer tool 260 determines precisely where object 300 should be placed. For example, an "align to grid" feature can be used. Many, objects 300 can be stacked on top of each other to nest subobjects 302 in objects 300. There is no limit on the depth such stacking can take. Model developer tool 260 lays out objects 300 from left-to-right, top-to-bottom. Clicking on one of objects in workspace 330 will select that object 300. At any time, the currently selected object 300 can be identified by a lowered surrounding bezel, highlighting, or the like. In addition, each object 300 has a unique identifier consisting of the type of object 300 followed by a machine-generated character sequence. The identifier of the currently selected (or first selected, in the case of multiple selection) object 300 is displayed in the lower left corner of the tool of the screen of model developer toll 260.

FIG. 9 illustrates the model developer property screen which displays objects 300 of the current model in tabular form and permits objects 300 to be configured for specific provisioning work processes, i.e. to configure work process objects. The model developer property screen includes, for each object 300, the type of object 300 in column 510. The programmer can designate a display name of object 300 to describe the provisioning process of the object in column 520. A more detailed description of object 300 can be entered in column 530. Tasks 138 of object 300 are entered and displayed in column 540. Any pre task of object 300 is entered and displayed in column 550 and any post task in column 560. Highlighting an object 300 will present the display name, the description, and the tasks 138 in editing pane 590 for editing. Apply button 570, in the lower right corner of the screen will cause the edits to be accepted. Reset button 580 will ignore any changes made in the edit window and clear it. Keep in mind that tasks of object 300 can be of the form described above and determine the provisioning work accomplished by the object. For example, the DoTask of the highlighted Do Undo object 300 of FIG. 9 is illustrated as a call to Java Code in Window 590.

Double-clicking on an object 300 will present a list of properties associated with the selected object 300. Although some of these properties preferably are read-only, many can be edited, and will effect the way in which the model operates. All objects 300 share a common set of properties, which can be examined and, in some cases, edited, Properties that can be edited include color (used to specify the color of the display of the icon representing object 300) and displayName (used to specify a meaningful label for object 300 which will be displayed onscreen across the top of the icon representing object 300 as shown in FIG. 6, for example). Properties that preferably cannot be changed include, the id (the unique id assigned to object 300 by engine 100), and the type (identifies the type of the corresponding object 300).

Figure 10:
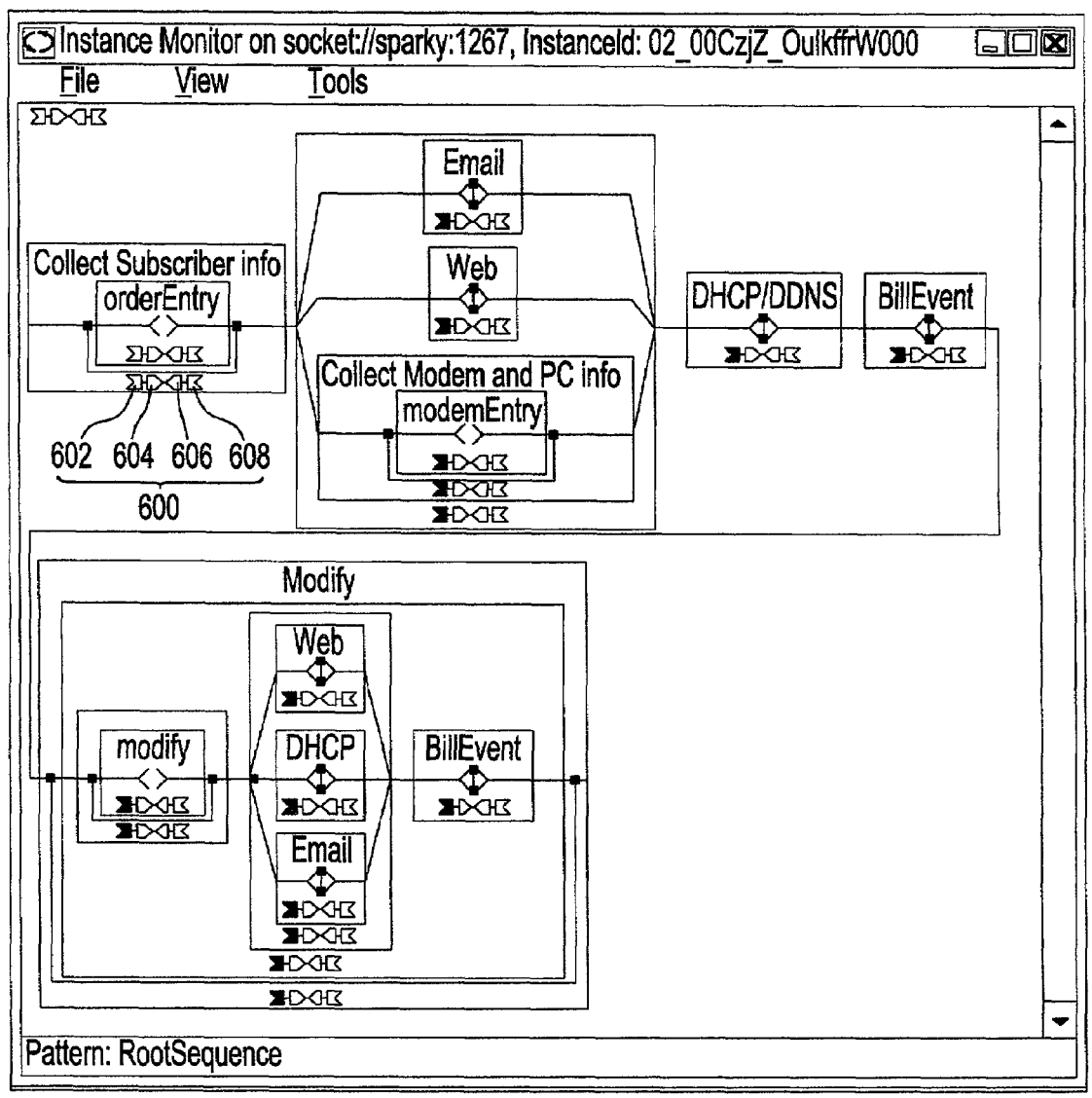
FIG. 10 illustrates a screen of the instance monitor of the preferred embodiment.

As illustrated in FIG. 10 Instance Monitor 270 presents a display similar to that of Model Developer 260, except that the display of Instance Monitor 270 is linked to a specific instance 110 of model 102. At any one time, every object 300 contained in instance 110 must be in one of four current states 120: notdone, doing, undoing, or done. Object 300 may be in many other states as well, but it must always be in one of these four. Every object 300 displayed in Instance Monitor 270 has state icon 600 displaying four buttons 602, 604, 606, and 608, for each of these four states respectively. The icon 602, 604, 606, or 608 corresponding to the current state of each object 300 is highlighted to reveal the current state of object 300. Buttons 604 and 606 are "clickable." Clicking on button 604 will send the do_id signal 140 to the associated object 300 (to accomplish the objects function) and clicking on button 606 will send the undo_id signal 140 (to undo the function) to the associated object 300. Of course, this should only be attempted with test forms of instances 110 to avoid interfering with operational models.

Figure 11:
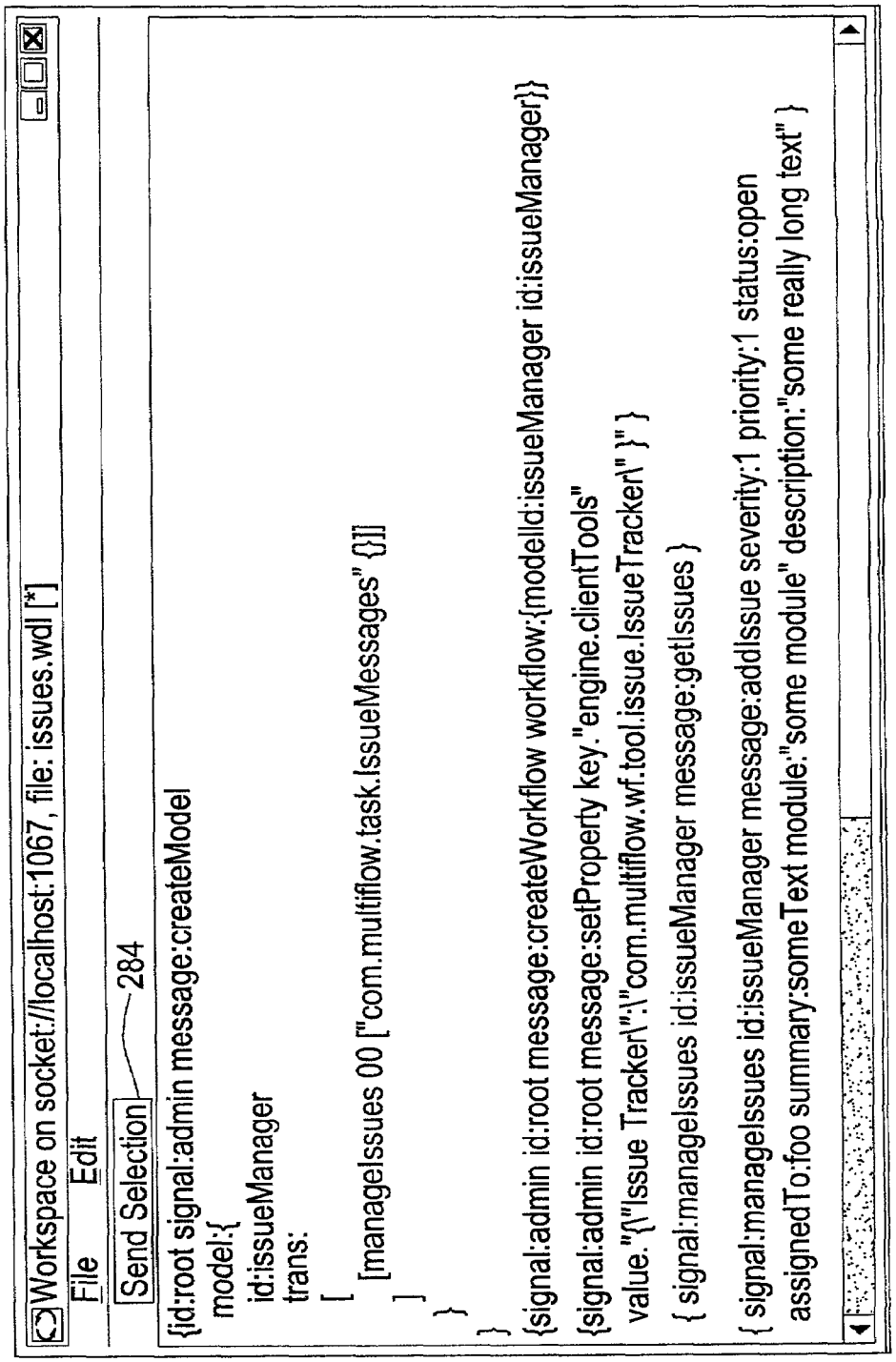
FIG. 11 illustrates a screen of the workspace tool of the preferred embodiment.

As illustrated in FIG. 11, workspace tool 280 provides a text editor window 282 with common text editing functions, including loading and saving text files from disk, cut-and-paste, go to line number etc. In addition, an arbitrary piece of text, called the "command text", can be selected and sent to provisioning engine 100 for interpretation and execution. To send command text to engine 100, the user clicks on Send Selection button 284. After execution of the command text, any response returned from provisioning engine 100 is inserted into the text immediately following the command text. If there is no response, then the string null is inserted instead. The command text will be deselected, and the response will be selected. To remove the response from the workspace, the user can press the Enter or Backspace keys to delete it. Provisioning engine 100 returns errors in the form of exceptions. When workspace tool 280 receives an exception, it will display the exception type, together with explanatory text (the exception message), in a pop-up window. After this window is dismissed, the exception message itself is inserted into the text immediately following the command text and selected. Workspace tool 280 permits the operator to access the entire API, not merely the subset of the API whose operation is facilitated by the other GUI components.

Workspace tool 280 also has a facility for automatically selecting complete syntactic units, including maps, lists, and sets. An entire enclosed map, list, or set can be selected by control-clicking inside such a unit. Shift-clicking in such a unit has a similar function, but the selected unit will be sent as well. Using workspace tool 280 requires an understanding of the signaling notation system described above, and how that language is used to define the signals that form API 210 of engine 100, as discussed in detail above. API 210 of engine 100 is accessed through its signaling interface described above.

Figure 12:
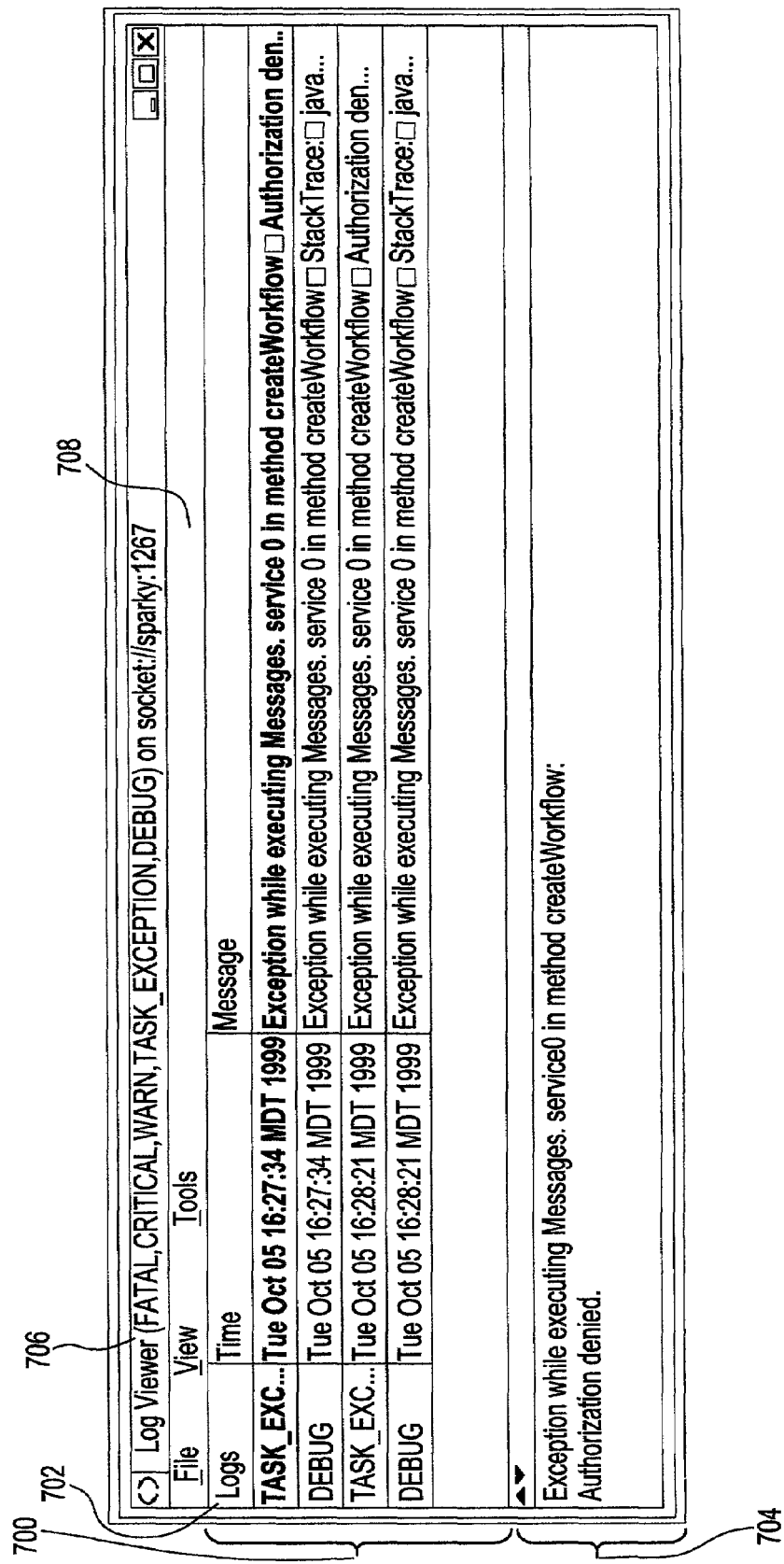
FIG. 12 illustrates a log viewer screen of the preferred embodiment.

Log viewer screen (FIG. 12) can be provided to allow a user to examine the actions being performed by engine 100 for debugging and troubleshooting. Engine 100 records its actions (called "events") by writing out these events to various files and output streams based on their category. Log viewer screen 700 is a user interface for viewing any of these logs and consists of a log event list table 702, and an information text area 704. Title bar 704 lists the event categories displayed in parentheses, and engine 100 to which the log applies. Menu bar 708 provides menu selections for File, View, and Tools. Event list table 702 contains the log listing divided into three columns which describe the category and time of the event, and the event message. The list may be sorted in order of any of these factors by clicking on the appropriate column. Clicking a second time will reverse sort the list. Selecting any event in the listing will cause it to be highlighted and an explanation or additional information will be displayed in the information text area.

There are a plurality of event categories that can be logged to track events of engine 100. Categories can be pre-defined by the system or defined by the user. The categories can be defined as desired to alert the user to various conditions. The logs can be filtered and or expected to parse out relevant information.

The following are examples of such categories:

FATAL: These are events that caused a fatal shutdown of engine 100.

CRITICAL: These are log events that have not caused engine 100 to exit, but nevertheless are considered critical to the operation of engine 100.

WARN: These are events worthy of special note, but of less concern than critical events.

TASK_EXCEPTION: Tasks that did not execute as expected.

LOG: Events normal to the running of engine 100.

DEBUG: Event messages that are useful in debugging engine 100.

It can be seen that the invention provides an object oriented pattern programming language and associated graphical interface for provisioning engines. The use of state machines having a set of plural states and the ability to schedule tasks for later execution permits the provisioning engine to accomplish and control work processes in a temporal manner. The provisioning engine and pattern language can be implemented as computer software written in any language and executed on any appropriate hardware platform. The various signals, data, maps, and the like can be of any form or protocol. Transitions or other state machines can be combined in any appropriate manner to define objects performing various provisioning functions or work processes. Various tasks can be defined and executed by the state machines. Signals can be generated by any appropriate device in any manner.

The invention has been described through a preferred embodiment and the drawing. However, it will be evident to one of skill in the art that various modifications can be made without departing from the scope of the appended claims and legal equivalents thereof.

What is claimed:

1. A method for provisioning communication services, the method comprising:
    defining a state machine associated with a communication services provisioning model, the state machine comprising a set of current states of the provisioning model;
    defining at least one transition within the provisioning model that defines conditions under which states are added to or removed from the set of current states of the provisioning model;
    generating a signal that identifies when a transition occurs that either adds states to the state machine or removes states from the state machine; and
    modifying arguments of the signal, by the at least one transition.

2. The method of claim 1, wherein the signal is generated by an external API of a provisioning engine.

3. The method of claim 1, wherein the signal is generated by one of the at least one transition.

4. The method of claim 1, wherein generating a signal that identifies when a transition occurs that either adds states to the state machine or removes states from the state machine further comprises: generating a signal API call; and
    delivering the signal at a predetermined time after generating the corresponding signal API call.

5. The method of claim 1, wherein the at least one transition comprises at least one of a signal type, a set of from states or a set of to states.

6. The method of claim 5, wherein the at least one transition performs at least one of adding the to states of the set of current states or removing the from states from the set of current states when a signal matching the signal type is received.

7. The method of claim 6, wherein the signal matching the signal type is received by an executing instance of the provisioning model and the from states are a subset of the set of current states.

8. The method of claim 1, wherein the provisioning model comprises a plurality of executing instances each storing data specific to a respective one of the instances.

9. The method of claim 8, wherein the provisioning model further comprises stored data to be used by each of the instances.

10. The method of claim 5, wherein the at least one transition further comprises at least one task that is executed when a signal matching the signal type is received.

11. The method of claim 5, wherein the from states are a subset of the set of current states.

12. The method of claim 10, wherein the at least one transition further comprises transition arguments that are communicated to the at least one task.

13. The method of claim 8, wherein at least one of the executing instances further comprises calls to another model as a sub-instance.

14. The method of claim 13, wherein the sub-instance further comprises means for communicating with the at least one instance.

15. The method of claim 13, wherein transitions of the at least one instance are configured to stop executing while the sub-instance executes and continues executing when the sub-instance is done executing.

16. A system for provisioning communication services, the system comprising:

means for defining a state machine associated with a communication services provisioning model, the state machine comprising a set of current states of the provisioning model;

means for defining at least one transition within the provisioning model that defines conditions under which states are added to or removed from the set of current states of the provisioning model; and means for generating a signal that identifies when a transition occurs that either adds states to the state machine or removes states from the state machine, wherein the at least one transition modifies arguments of a generated signal.

17. The system of claim 16, wherein the at least one transition comprises at least one of a signal type, a set of from states or a set of to states.

18. The system of claim 17, wherein the at least one transition performs at least one of adding the to states to the set of current states or removing the from states from the set of current states when a signal matching the signal type is received.

19. The system of claim 17, wherein the signal matching the signal type is received by an executing instance of the provisioning model and the from states are a subset of the set of current states.

20. The system of claim 16, wherein the signal is generated by an external API of the system for provisioning communication services.

21. The system of claim 16, wherein the means for generating a signal further comprises:

means for generating a signal API call; and means for delivering a signal at a predetermined time after a corresponding signal API call.

22. The system of claim 16, wherein the provisioning model comprises a plurality of executing instances each storing data specific to a respective one of the instances.

23. The system of claim 22, wherein the provisioning model further comprises stored data to be used by each of the instances.

24. The system of claim 17, wherein the at least one transition further comprises at least one task that is executed when a signal matching the signal type is received.

25. The system of claim 17, wherein the from states are a subset of the set of current states.

26. The system of claim 24, wherein the at least one transition further comprises transition arguments that are communicated to the at least one task.

27. The system of claim 22, wherein at least one of the executing instances further comprises calls to another model as a sub-instance.

28. The system of claim 27, wherein the sub-instance further comprises means for communicating with the at least one of the executing instances.

29. The system of claim 27, wherein transitions of the at least one instance are configured to stop executing while the sub-instance executes and to continue executing when the sub-instance is done executing.

* * * * *